(12) United States Patent
Kwak et al.

(10) Patent No.: US 10,903,964 B2
(45) Date of Patent: Jan. 26, 2021

(54) TECHNIQUES TO ENABLE PHYSICAL DOWNLINK CONTROL CHANNEL COMMUNICATIONS

(71) Applicant: Apple Inc., Cupertino, CA (US)

(72) Inventors: Youngjun Kwak, Portland, OR (US); Debdeep Chatterjee, San Jose, CA (US); Hong He, Sunnyvale, CA (US); Gang Xiong, Portland, OR (US); Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/488,153

(22) PCT Filed: Mar. 22, 2018

(86) PCT No.: PCT/US2018/023883
§ 371 (c)(1),
(2) Date: Aug. 22, 2019

(87) PCT Pub. No.: WO2018/175806
PCT Pub. Date: Sep. 27, 2018

(65) Prior Publication Data
US 2020/0007295 A1    Jan. 2, 2020

Related U.S. Application Data

(60) Provisional application No. 62/616,749, filed on Jan. 12, 2018, provisional application No. 62/567,196, (Continued)

(51) Int. Cl.
*H04L 5/00* (2006.01)
*H04W 72/04* (2009.01)

(52) U.S. Cl.
CPC .......... *H04L 5/0053* (2013.01); *H04L 5/0007* (2013.01); *H04L 5/0042* (2013.01); *H04W 72/042* (2013.01)

(58) Field of Classification Search
CPC ... H04L 5/0007; H04L 5/0042; H04L 5/0053; H04W 72/042
See application file for complete search history.

(56) References Cited

U.S. PATENT DOCUMENTS 8,494,454 B2 * 7/2013 McBeath ............ H04W 52/248
455/68
8,606,286 B2 * 12/2013 Vrzic .................... H04L 5/0053
455/450

(Continued)

FOREIGN PATENT DOCUMENTS

EP       3226434 A1 * 10/2017   ........ H04W 28/0252

OTHER PUBLICATIONS

International Search Report and Written Opinion for the International Patent Application No. PCT/US18/23883, dated Jul. 19, 2018, 9 pages.

(Continued)

*Primary Examiner* — Asad M Nawaz
*Assistant Examiner* — Thomas R Cairns
(74) *Attorney, Agent, or Firm* — Eschweiler & Potashnik, LLC

(57) ABSTRACT

Embodiments may be directed to techniques to determine physical downlink control channel (PDCCH) candidates to assign to a user equipment (UE) based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level. Embodiments also include selecting at least one of the PDCCH candidates to utilize to send downlink control information (DCI) to the UE, and causing (Continued)

transmission of the DCI to the UE via the PDCCH candidates selected.

24 Claims, 17 Drawing Sheets

Related U.S. Application Data filed on Oct. 2, 2017, provisional application No. 62/476,427, filed on Mar. 24, 2017.

(56) References Cited

U.S. PATENT DOCUMENTS

| | | | | |
|---|---|---|---|---|
| 8,644,245 | B2* | 2/2014 | Ahn | H04L 1/1812 370/330 |
| 9,883,495 | B2* | 1/2018 | Papasakellariou | H04W 24/00 |
| 10,142,968 | B2* | 11/2018 | Ji | H04L 5/0053 |
| 10,356,778 | B2* | 7/2019 | Tseng | H04L 5/0053 |
| 2016/0037543 | A1 | 2/2016 | Papasakellariou | |
| 2018/0254853 | A1* | 9/2018 | Jung | H04L 1/0038 |
| 2020/0008180 | A1* | 1/2020 | Jo | H04L 5/0007 |

OTHER PUBLICATIONS

Intel Corporation, "Hierarchical Search Space Design", vol. RAN WG1, No. Athens, Greece; Feb. 13, 2017-Feb. 17, 2017, Feb. 12, 2017 (Feb. 12, 2017), 3GPP Draft; R1-1702222 Retrieved from the Internet: URL: http://www.3gpp.org/ftp/Meetings_3GPP_SYNC/RAN1/Docs/XP051209380 [retrieved on Feb. 12, 2017] Sections 1-3.

* cited by examiner

400

405
DETERMINE PHYSICAL DOWNLINK CONTROL CHANNEL (PDCCH) CANDIDATES TO ASSIGN TO A USER EQUIPMENT (UE) BASED ON ONE OR MORE AGGREGATION LEVELS, EACH PDCCH CANDIDATE IN A HIGHEST AGGREGATION LEVEL OF THE ONE OR MORE AGGREGATION LEVELS ASSIGNED BY A RANDOM DISTRIBUTION OVER A WHOLE CONTROL CHANNEL ELEMENT (CCE) DOMAIN, AND EACH PDCCH CANDIDATE IN ONE OR MORE NON-HIGHEST AGGREGATION LEVELS OF THE ONE OR MORE AGGREGATION LEVELS ASSIGNED A RANDOM DISTRIBUTION OVER ONE OR MORE CCES UTILIZED BY PDCCH CANDIDATES OF THE HIGHEST AGGREGATION LEVEL

410
SELECT AT LEAST ONE OF THE PDCCH CANDIDATES TO UTILIZE TO SEND DOWNLINK CONTROL INFORMATION (DCI) TO THE UE

415
CAUSE TRANSMISSION OF THE DCI TO THE UE VIA THE PDCCH CANDIDATES SELECTED

DETERMINE PHYSICAL DOWNLINK CONTROL CHANNEL (PDCCH) CANDIDATES TO MONITOR BASED ON ONE OR MORE AGGREGATION LEVELS, EACH PDCCH CANDIDATE IN A HIGHEST AGGREGATION LEVEL OF THE ONE OR MORE AGGREGATION LEVELS ASSIGNED BY A RANDOM DISTRIBUTION OVER A WHOLE CONTROL CHANNEL ELEMENT (CCE) DOMAIN, AND EACH PDCCH CANDIDATE IN ONE OR MORE NON-HIGHEST AGGREGATION LEVELS OF THE ONE OR MORE AGGREGATION LEVELS ASSIGNED A RANDOM DISTRIBUTION OVER ONE OR MORE CCES UTILIZED BY PDCCH CANDIDATES OF THE HIGHEST AGGREGATION LEVEL
455

MONITOR THE PDCCH CANDIDATES TO RECEIVE DOWNLINK CONTROL INFORMATION (DCI) FROM A BASE STATION
460

RECEIVE, FROM THE BASE STATION, THE DCI VIA AT LEAST ONE OF THE PDCCH CANDIDATES
465

*FIG. 4B*

Broadband Wireless Access System 700

TECHNIQUES TO ENABLE PHYSICAL DOWNLINK CONTROL CHANNEL COMMUNICATIONS

CROSS-REFERENCE TO RELATED APPLICATIONS

This application is a national phase claiming the benefit of and priority to International Patent Application No. PCT/US2018/023883, entitled "TECHNIQUES TO ENABLE PHYSICAL DOWNLINK CONTROL CHANNEL COMMUNICATIONS", filed Mar. 22, 2018, which claims the benefit of and priority to previously filed U.S. provisional patent application Ser. No. 62/476,427 filed Mar. 24, 2017, U.S. provisional patent application Ser. No. 62/567,196 filed Oct. 2, 2017, and U.S. provisional patent Ser. No. 62/616,749 filed Jan. 12, 2018, which are hereby incorporated by reference in their entireties.

TECHNICAL FIELD

Embodiments described herein include techniques to enable physical downlink control channel (PDCCH) communications. More specifically, embodiments are directed to enable processing to enable PDCCH communication in accordance with a search space design while limiting the number of control channel candidates.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometimes conflicting performance dimensions and services. Such diverse multi-dimensional requirements are driven by different services and applications. In general, NR will evolve based on 3GPP (Long-Term Evolution) LTE-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

FIG. 4A illustrates an example of a first logic flow diagram.

FIG. 4B illustrates an example of a second logic flow diagram.

DETAILED DESCRIPTION

Figure 1:
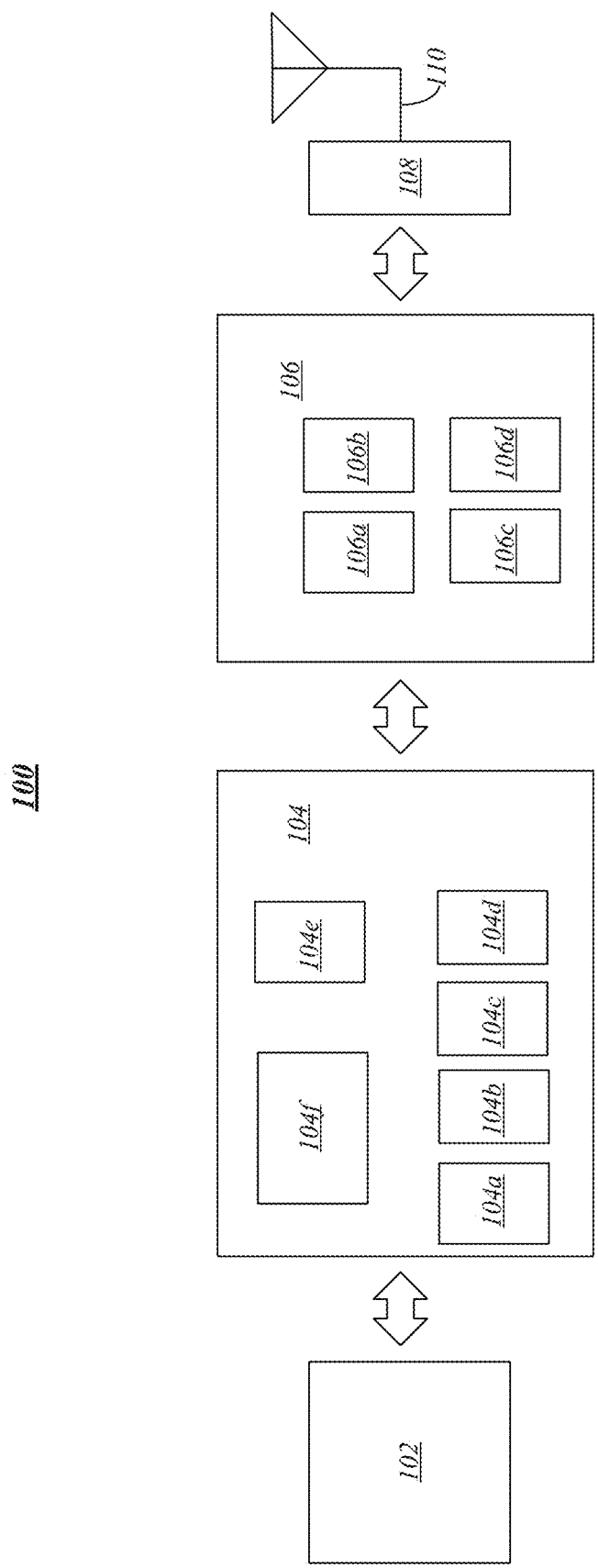
FIG. 1 illustrates an example of a system.

Embodiments discussed herein may be general related downlink control channel design, and specifically downlink (DL) control channel design for NR. For the reduction of UE complexity, it is desirable to define a search space which reduces the number of candidate control channels to be monitored by the UE. In LTE, search space was determined based on a pseudo-random position for each aggregation level, and the design gives no UE complexity with CRS (Cell-specific reference signal) design. However in NR, without the use of CRS, the LTE search space design is not the best choice.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example of a UE device 100 that may be representative of a UE that implements one or more of the disclosed techniques in various embodiments including performing the hierarchical search space approach discussed herein. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Figure 2:
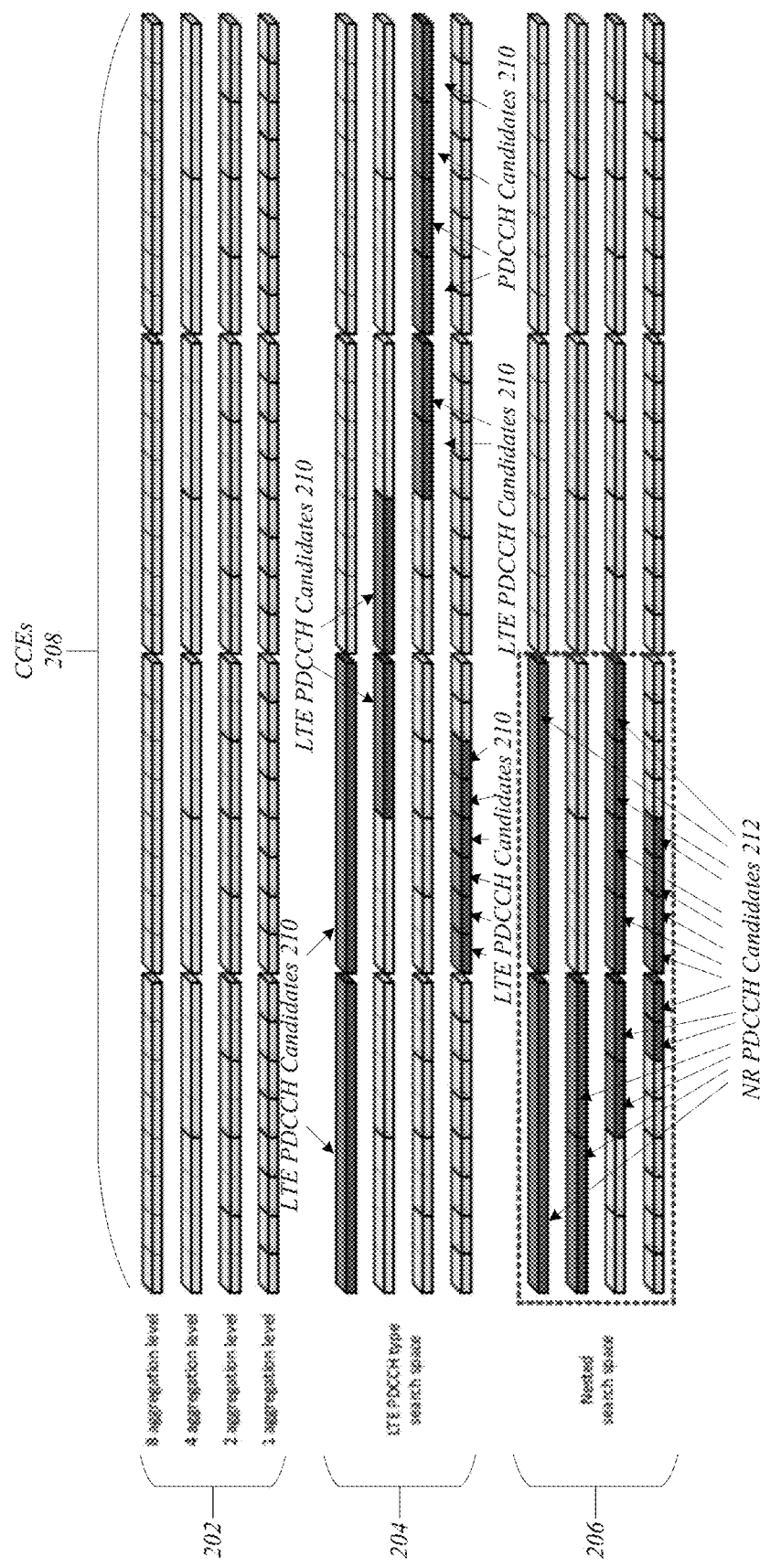
FIG. 2 illustrates an example of search space design comparison.

FIG. 2 illustrates a comparison between search space designs 200. More specifically, FIG. 2 illustrates a comparison between LTE search space design 204 and a NR search space design 206. At bracket 202, FIG. 2 illustrates an example number of aggregation levels Ls, e.g., L∈{1, 2, 4, 8}, Note that embodiments are not limited in this manner, in some instances a 16 aggregation level may be utilized, for example. Each of the aggregation levels may be made of a number of control channel elements (CCEs) 208. Although not shown, the CCEs 208 include a number of resource element groups (REGs), e.g. 6, REGs/CCE, and each of the REGs may include a number of resource elements, e.g., 12 resource elements/REG in the frequency domain. The resource elements are the smallest unit of the resource grid made up of one subcarrier in the frequency domain and one OFDM symbol in the time domain.

In the LTE search space design 204, the search space is determined based on a pseudo-random position for each aggregation level as shown in the middle of FIG. 2 by the LTE PDCCH candidates 210 locations. However, in the LTE search space design 204, the UE needs to perform the channel estimation for all CCEs 208 where all the LTE channel candidates 210 exist. For the reduction of UE complexity, it is desirable to minimize the CCEs 208 that need channel estimation. Therefore, in one example, the NR search space design 206, includes a nested search space approach that can be used as shown in the bottom of FIG. 2 at bracket 206. In embodiments, the NR search space design 206 of FIG. 2 strives to overlap CCEs 208 between NR Physical Downlink Control Channel (PDCCH) candidates 212 of multiple aggregation levels. Note that the NR PDDCH candidates discussed herein may also be referred to as PDDCH candidates and embodiments are not limited in this manner.

In embodiments, the channel estimation burden can be decreased a lot with the NR search space design 204 compared to LTE search space design 202. However, the blocking probability should be considered for the design of search space for the NR search space design 204. The blocking probability is defined by the ratio of the average number of UEs that cannot be scheduled in the search space over the total number of UEs. Since there is overlapping between NR PDCCH candidates 212, the blocking probability of nested approach of FIG. 2 can be higher than LTE design 204. Therefore, certain means to reduce the blocking probability is needed for the nested search space design.

In some instances, the search space is determined based on the CCEs that are occupies by NR PDCCH candidates of highest aggregation level, e.g., aggregation level 8 (AL8), and the remaining NR PDCCH candidates of lower aggregation levels 4, 2, and 1 (AL4, AL2, and AL1, respectively) can be determined using various concepts disclosed herein. For example, in a search space, there are two NR PDCCH candidates of AL8, two NR PDCCH candidates of AL4, six NR PDCCH candidates of AL2, and six NR PDCCH candidates of AL1. This is just one example of search space assumption, and this does not necessarily mean that exactly the same number of NR PDCCH candidates for each aggregation levels may be used. The concept may be applicable for all relevant cases in broad manner.

Figure 3A:
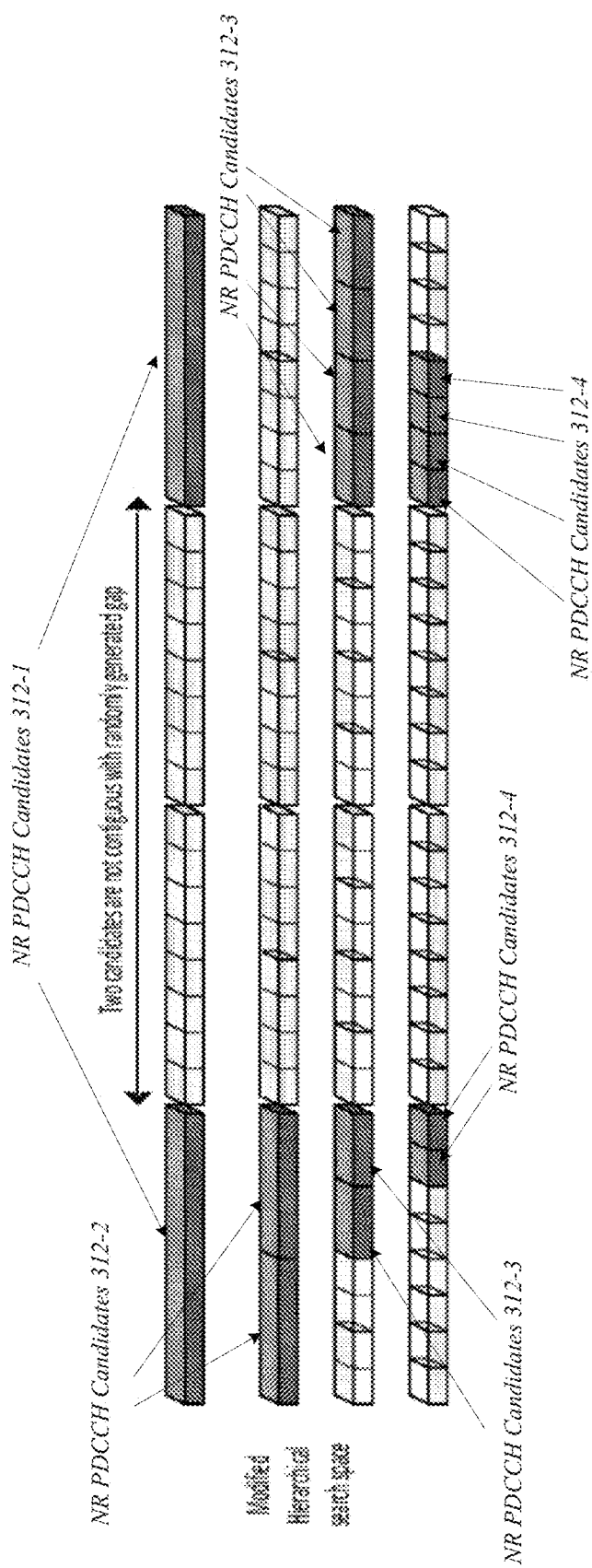
FIG. 3A-3I illustrate examples of search space designs.

FIGS. 3A-3I illustrate examples of search space designs while considering the blocking probabilities with overlapping NR PDCCH candidates for communication of DCI between base station, such as an evolved Node B (eNB) or a next Generation Node B (gNB), and one or more UEs. In embodiments, the search space designs may specify search space candidates that may be used by the eNB/gNB to communicate the DCI with one or more UEs. FIG. 3A illustrates a NR search space design 300. In FIG. 3A, the NR search space design 300 illustrates two NR PDCCH candidates 312-1 of AL8 with a randomly generated gap between them. The NR PDCCH candidates (312-2, 312-3, and 312-4) of AL4, AL2, and AL1, respectively, can be determined within the CCEs that are occupied by NR PDCCH candidates 312-2 of AL8. Thus, NR PDCCH candidates 312 do not necessarily have to contiguous in the CCE domain, and they can be randomly distributed.

In FIG. 3A, the NR PDCCH candidates 312-1 of AL8 can be determined by the starting position of the first PDCCH and the gap between two consecutive PDCCHs candidates. The starting position and/or the gap can be determined by a random hashing function performed by the UE and at least using the UE ID and slot index or both of them. Equation 1 illustrates one example equation of the starting position.

$$L\left\{(Y_K + m) \bmod \left\lfloor \frac{N_{CCE}}{L} \right\rfloor\right\}, \quad (1)$$

where $Y_K$ is a hashing function using UE ID or slot index or beam index or a combination of them, L=8, and $N_{CCE}$ is the total number of CCEs in one control resource set configured for a given UE. Equation 2 illustrates another example equation of the gap.

$$L\left\{(X_K) \bmod \left(\left\lfloor \frac{N_{CCE}}{L} \right\rfloor - 1\right)\right\}, \quad (2)$$

where $X_K$ is a hashing function using UE ID.

Figure 3B:
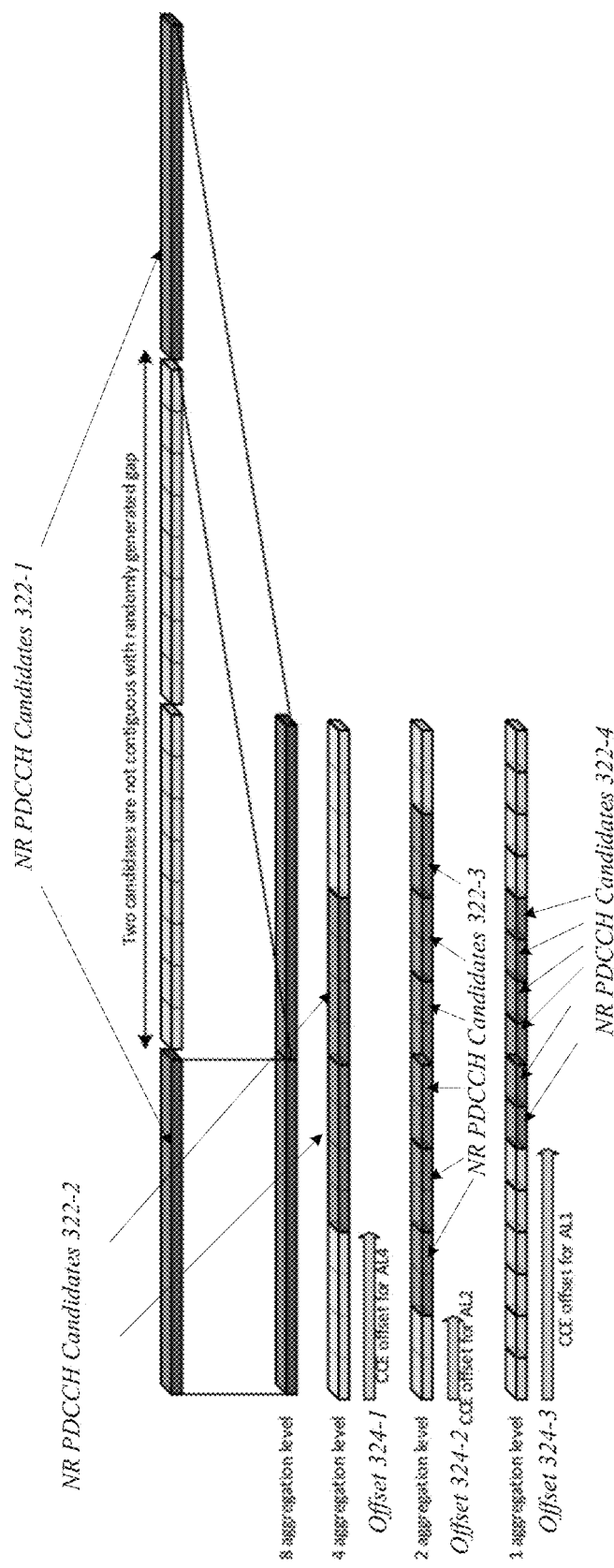

Alternatively, the starting position or the gap may generate independently of the associated AL. For example, in FIG. 3B, the NR PDCCH candidates (322-2, 322-3, and 322-4) of AL4, AL2, and AL1 can be determined inside the two different CCE chunks that are occupied by NR PDCCH candidates 322-1 of AL8, and they are transmitted in a localized manner In one example, the starting position in CCE is determined using pseudo random function, which may use UE ID. One example for CCE offset 324-1 is $(Z_{4\_1}$ (mod 3) for AL4, CCE offset 324-2 $4(Z_{2\_K}$ mod 3) for AL2, and CCE offset 324-3 $2(Z_{2\_K}$ mod 11) for AL1, where $Z_{4\_K}$, $Z_{2\_K}$, and $Z_{2\_K}$ are hashing functions using UE ID and in this case, the NR PDCCH candidates 322-2, 322-3, and 322-4 are positioned every aggregation level inside the available CCEs, as illustrated in FIG. 3B. In other instances, the CCE offsets 324 may be configured on a per UE basis through higher layer signaling. In particular, it is possible that only one value of offset 324 may be indicated by the gNB and all the other offsets 324 can be implicated mapping, e.g. based on the UE ID or slot index or a combination of them. Having a random gap between two PDCCH candidates with the aggregation level 8 (AL8), this option decreases the blocking probability to be comparable to or even smaller than LTE.

Figure 3C:
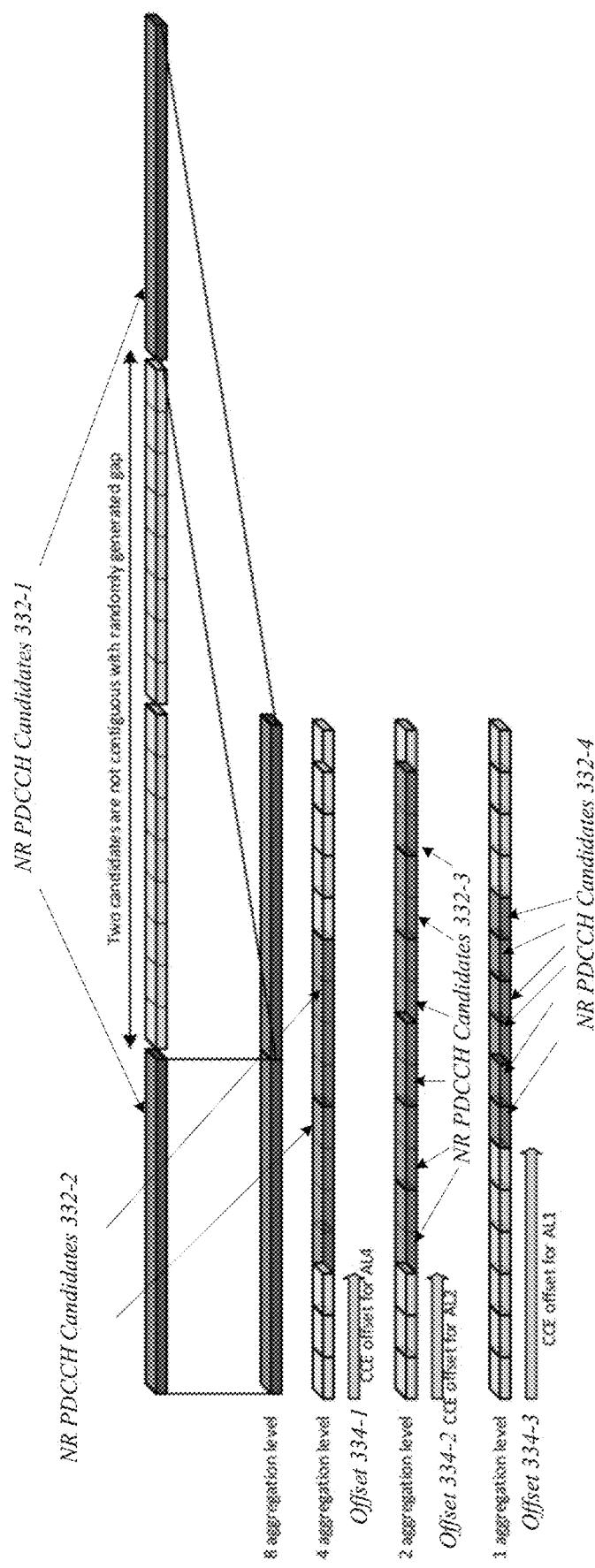

FIG. 3C illustrates an another example configuration where the NR PDCCH candidates 332-1 of AL8 can be determined by the starting position of the first PDCCH and the gap between PDCCHs. The starting position and/or the gap can be determined by a random hashing function using the UE ID as described above.

In FIG. 3C, the NR PDCCH candidates (332-2, 332-3, and 332-4, respectively) of AL4, AL2, and AL1 can be determined inside the two different CCE chunks that are occupied by NR PDCCH candidates 332-1 of AL8, and they are determined contiguously. One possible solution is that the starting position in CCE is determined using pseudo random function, which may use UE ID. One example for CCE offset 334-1 is $(Z_{4\_1}$ (mod 9) for AL4, the CCE offset 334-2 $4(Z_{2\_K}$ mod 5) for AL2, and the CCE offset 334-3 $2(Z_{2\_K}$ mod 11) for AL1, where $Z_{4\_K}, Z_{2\_K}$, and $Z_{2\_K}$ are hashing functions using UE ID and in this case, the NR PDCCH candidates 332 are positioned every CCE level inside the available CCEs.

Figure 3D:
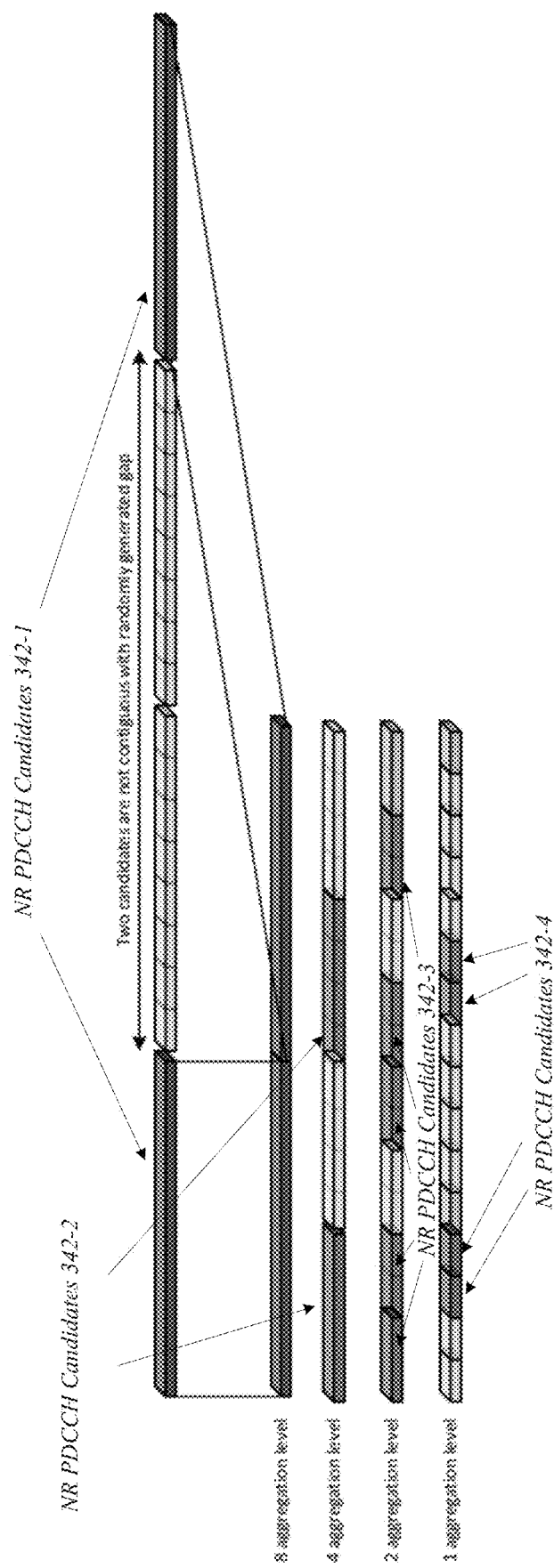

In FIG. 3D, the NR PDCCH candidates 342-1 of AL8 can be determined by the starting position of the first PDCCH and the gap between PDCCHs. The starting position and the gap can be determined by a random hashing function using the UE ID as described above. Further, the NR PDCCH candidates (342-2, 342-3, and 342-4, respectively) of AL4, AL2, and AL1 can be determined inside the two different CCE chunks that are occupied by NR PDCCH candidates 342-1 of AL8 and the 342-2, 342-3, and 342-4 are determined in non-contiguous or distributed manner. The NR PDCCH candidates (342-2, 342-3, and 342-4) of AL4, AL2, and AL1 can be scattered inside the available CCE in order to be overlapped with CCE of NR PDCCH candidates 342-1 of AL8. The NR PDCCH candidates (342-2, 342-3, and 342-4) of AL4, AL2, and AL1 can be positioned every aggregation level or every CCE, as illustrated in FIG. 3D.

Figure 3E:
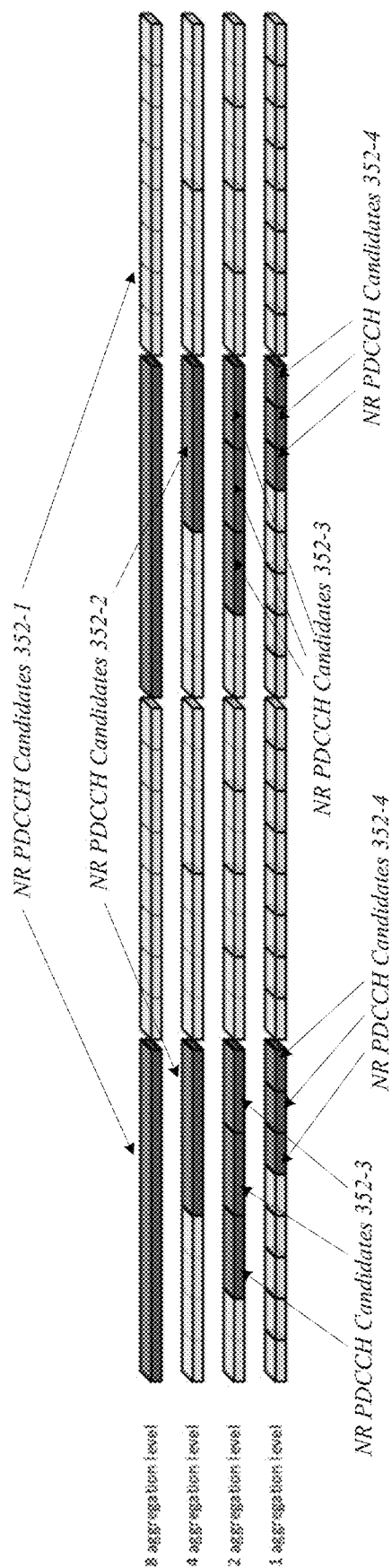

In FIG. 3E, the number of NR PDCCH candidates 352 can be equally split for each AL. The starting position and/or the gap for the largest AL, e.g. AL8, can be determined based on a random hashing function using the UE ID as described above.

Further, for first and second half of PDCCH candidates 352, the CCE used for lower ALs is a subset of the CCE used for larger AL. The NR PDCCH candidates (352-2, 352-3, and 352-4) of AL4, AL2, and AL1 can be determined inside the two different CCE chunks that are occupied by NR PDCCH candidates 352-1 of AL8 and they are determined in contiguous or non-contiguous manner Note that in case when PDCCH candidates (352-2, 352-3, and 352-4) for AL1/2/4 in each trunk are determined in non-contiguous manner, they can be scattered equally within each trunk. Alternatively, the starting position of lower ALs can be determined based on a random hashing function. Moreover, FIG. 3E illustrates when PDCCH candidates (352-2, 352-3, and 352-4) for AL1/2/4 in each trunk are determined in a contiguous manner.

Figure 3F:
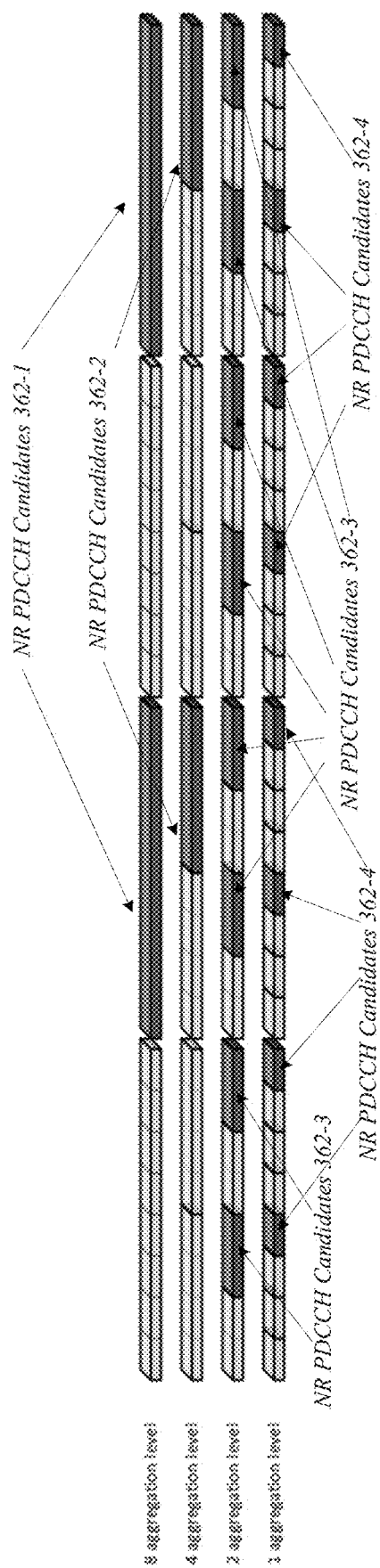

FIG. 3F illustrates another example of a search space design 360. In case when total number of CCEs for NR PDCCH candidates 362 for each AL is 2n where n is an integer, equally scattered search space structure can be considered. Moreover, FIG. 3F illustrates one example of this option for a search space design. In this example, the number of NR PDCCH candidates 362 for AL1/2/4/8 is 8/8/2/2, respectively.

Figure 3G:
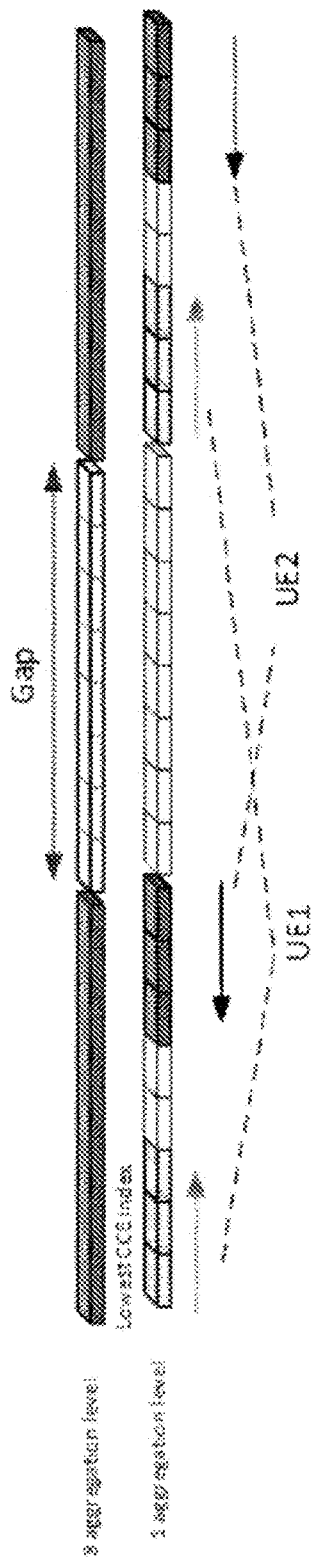

FIG. 3G illustrates an example search space design 370 where a UE ID and PDCCH aggregation level may be used for the starting position and CCE mapping order. In particular, the CCEs corresponding to NR PDCCH candidates for a given UE starts the lowest CCEs if (UE ID mod Aggregation Level=0) and starts from the highest CCEs otherwise.

Figure 3H:
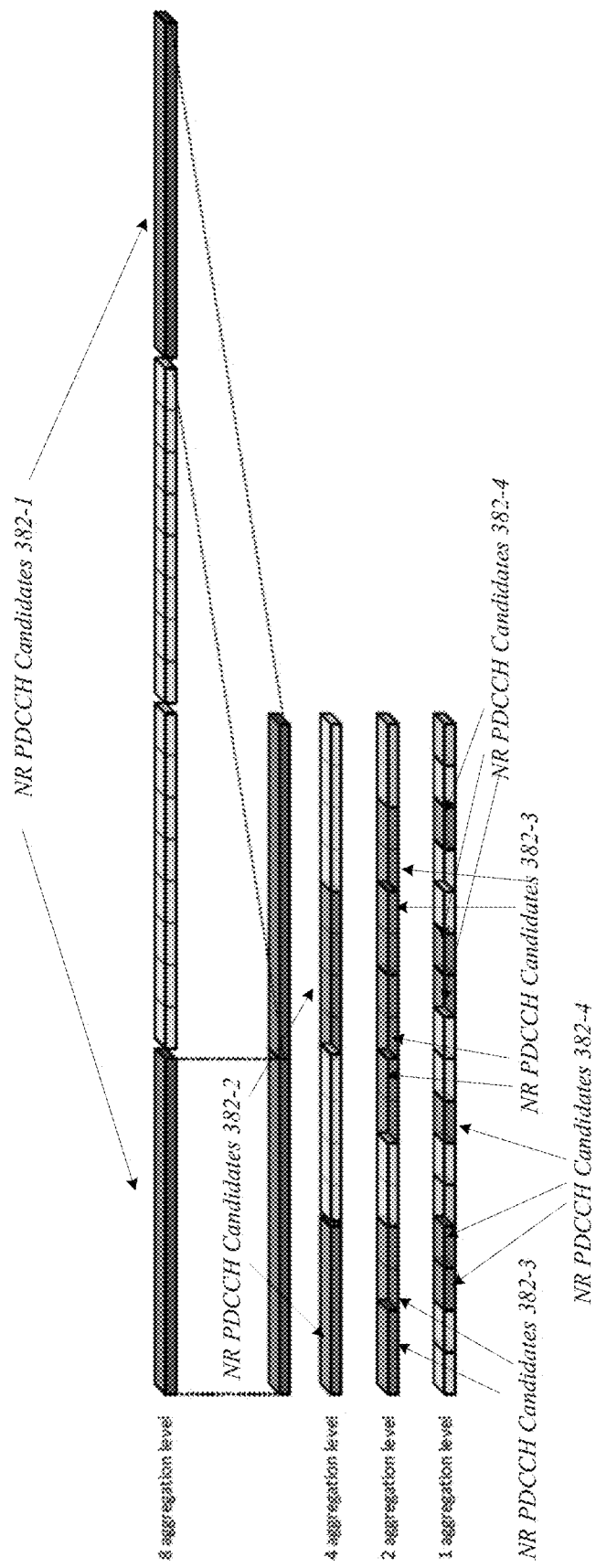

FIG. 3H illustrates an example of search space design 380. In some embodiments, search space design may be include a nested approach and each NR PDCCH 382 candidate can be located in the CCE domain in a non-contiguous manner Therefore, for a certain aggregation level, the NR PDCCH candidates 382 are not contiguous in CCE domain, and they can be randomly distributed.

In nested approach, the CCEs corresponding to NR PDCCH candidates 382 at the highest aggregation level, e.g., AL8 or AL16, can be randomly distributed over the whole control region consisting of a set of CCEs, or over the whole control resource set (CORESET) region. But for the CCEs corresponding to NR PDCCH candidates, 382 at non-highest aggregation levels (ALs 4/2/1) or lower ALs can be randomly distributed over the CCEs corresponding to the NR PDCCH candidates 382 at the highest AL. In one example, the number of PDCCH candidates at each aggregation level can be independently configured for a UE. Thus, the highest aggregation level can be different between UEs depending on the configuration, where the configuration can be done by either radio resource control (RRC) signaling, media access control (MAC) signaling, and/or physical layer (PHY) signaling (e.g., DL control signaling) between the UE and the gNB or eNB. In this example, the random distribution has to be known by both UE and gNB, so the randomization function is explicitly defined for the UE and gNB.

In one specific example, if the highest aggregation level is configured as 8 for a UE, then the NR PDCCH candidates 382-1 of AL8 (Aggregation level 8) can be determined using a certain randomization function over the whole or a part of a CORESET and the CCEs corresponding to NR PDCCH candidates 382-2, 382-3, and 382-4 at the AL4 (Aggregation level 4), AL2 (Aggregation level 2), and AL1 (Aggregation level 1) can be determined within the CCEs that are occupied by NR PDCCH candidates 382-1 at the AL8. And the NR PDCCH candidates of AL4, AL2, and AL1 (382-2, 382-3, and 382-4) can be further scattered within the available CCEs sets corresponding to the PDCCH candidates at the AL8 to avoid the increased channel estimations. The NR PDCCH candidates of lower ALs, including AL4, AL2, and AL1 (382-2, 382-3, and 382-4) can be positioned every aggregation level or every CCE. FIG. 3H conceptually illustrates this design, where the number of NR PDCCH candidates are 2, 2, 6, and 6 for AL8, AL4, AL2, and AL1 (382-1, 382-2, 382-3, and 382-4) respectively and the total number of CCEs is 32.

Further and as mentioned above, the randomization function for determining the PDCCH candidates has to be clearly pre-defined in order for both gNB and UE to know which PDCCH candidates has to be used or monitored. One example of a randomization function may be utilized by the UE and/or gNB as discussed in the following description.

The CCEs corresponding to NR PDCCH candidate m of the search space $S_k^{(L)}$ of the highest aggregation level $L^{Highest}$ are given by equation 3:

$$S_k^{(L)} = L\left\{(Y_k + \pi_k(m) + b) \bmod \left\lfloor \frac{N_{CCE,k}^L}{L} \right\rfloor\right\} + i \quad (3)$$

where $Y_k$ is defined below in equation 4, $i=L-1$ and $m=0, \ldots, M^L-1$. $M^L$ is the number of NR PDCCH candidates of the aggregation level of L to monitor in a given search space. Variable b can be used for carrier aggregation case, e.g., $b=M^L \times n_{CI}$, where $n_{CI}$ is the carrier indicator field. Or b can include other information, e.g., CORESET index.

$N_{CCE,k}^L$ is the total number of CCEs in the CORESET of slot k. Equation 4 is found below:

$$Y_k = (A \cdot Y_{k-1}) \bmod D \quad (4)$$

where $Y_{-1} = n_{RNTI} \neq 0$, $A=39827$, $D=65537$, and $k=\lfloor n_s/2 \rfloor$, $n_s$ is the slot number within a radio frame. If the CORESET is non-slot based scheduling, then k can be a function of slot number and/or OFDM symbol index for the corresponding CORESET. In other instances, k can be a function of slot number and/or starting OFDM symbol index for the corresponding CORESET and $Y_k$ can be defined differently for aggregation levels. To reduce blocking across different overlapping CORESETs, $Y_k$ can be derived from CORESET index, e.g., by setting $Y_{-1} = n_{RNTI} + CORESET\_ID$. In another example, the $Y_k$ value is further indexed for each CORESET to use different values of A in the above equation 4 as a function of the CORESET index. Further, the maximum number of overlapping CORESETs allowed may be pre-defined.

The Radio Network Temporary Identifier (RNTI) value used for $n_{RNTI}$ may be a UE ID that may be configured UE-specific. In one embodiment, for common search spaces or group common downlink control information (DCIs), $Y_k$ can be set to 0.

According to certain aspects of this present invention, the $Y_k$ value may be configured by higher layers or DCI format for a UE and serves as an offset to distribute the CCEs corresponding to NR PDCCH candidates at the highest ALs for different UEs across the control regions so as to reduce the blocking probability.

In some embodiments, the CCEs corresponding to NR PDCCH candidates m at the highest aggregation levels $L^{Highest}$ may be given by equation 5:

$$\left(Y_k + b + \left\lfloor \frac{m \cdot N_{CCE,k}^L}{L^{Highest} \cdot M^{L^{Highest}}} \right\rfloor\right) \bmod \left\lfloor \frac{N_{CCE,k}^L}{L^{Highest}} \right\rfloor + i \cdot \left\lfloor \frac{N_{CCE,k}^L}{L^{Highest}} \right\rfloor. \quad (5)$$

With this approach, the NR PDCCH candidates at the highest aggregation level is distributed on a CCE granularity across the CORESET region to maximize the frequency selective scheduling gain. In this example, $M^{L^{Highest}}$ is the maximum number of NR PDCCH candidates to determine a virtual set of CCEs that cover all candidates for a full set of aggregation levels (ALs). It should be noted that the set of NR PDCCH candidates to actually monitor at AL $L^{Hghest}$ may be smaller than $M^{L^{Highest}}$, as will be discussed in more detail below, and which may be explicitly configured by higher layers.

In embodiments, in order for a UE to know where to search for its DCI, i.e., the location of virtual search space of NR PDCCH candidates, $M^{L^{Highest}}$ and $L^{Hghest}$ may be configured by higher layers for a UE for each CORESET such that UE knowns which CCE aggregation level can be used as a reference to create the nested PDCCH search spaces.

In embodiments, if the NR PDCCH candidates of the highest level aggregation level are defined contiguously inside the whole CCE, then $\pi_D(m) = m$ can be used to determine the premutation vector. If the PDCCH candidates of the highest aggregation level are defined non-continuously inside the whole CCE, following equation 6 can be used for determining permutation vector.

$\pi_D(\cdot)$ can be the pseudo-randomly permutated (sorted) sequence from $$\left\{0, 1, 2, \ldots, \left\lfloor \frac{N_{CCE,k}^L}{L} \right\rfloor - 1\right\}. \quad (6)$$

For example, if $\left\lfloor \frac{N_{CCE,k}^L}{L} \right\rfloor = 8$, $\pi_0(\cdot) = \{0, 1, 2, 3, 4, 5, 6, 7\}$ $\pi_1(\cdot) = \{0, 5, 3, 7, 1, 6, 2, 4\}$ $\pi_2(\cdot) = \{0, 3, 4, 7, 6, 5, 2, 1\}$.

In embodiments, for a nested approach, the CCEs that are used for NR PDCCH candidates of the highest aggregation level $L^{Highest}$ may be indexed to generate the virtual CCEs.

If the highest aggregation level is 8 and the number of NR PDCCH candidates for AL8 is 2 then the number of virtual CCE can be 16. And the virtual CCEs are indexed from 0 to 15. In embodiments, the virtual CCE index can be different from the actual CCE index.

In this example, the virtual CCEs corresponding to NR PDCCH candidate m of the search space $S_k^{(L)}$ of the non-highest aggregation level L may be given by equation 7:

$$S_k^{(L)} = L\left\{(Y_k + \pi_k(m) + b) \bmod \left\lfloor \frac{N_{CCE,k}^L}{L} \right\rfloor\right\} + i \quad (7)$$

where $Y_k$ is as defined below, i=0, . . . , L−1 and m=0, . . . , $M^L$−1. $M^L$ is the number of NR PDCCH candidates of the aggregation level of L to monitor in the given search space, $N_{CCE,k}^L$ is $L^{Highest} * M^{L^{Highest}}$ and $\pi_k(\cdot)$ may be the pseudo-randomly permutated (sorted) sequence from $$\left\{0, 1, 2, \ldots, \left\lfloor \frac{N_{CCE,k}^L}{L} \right\rfloor - 1\right\}.$$

In embodiments, b may be used for carrier aggregation case, e.g., $b = M^L \times n_{CI}$, where $n_{CI}$ is the carrier indicator field. Or, alternatively, b may include other information, e.g., CORESET index. Equation 8 below:

$$Y_k = (A \cdot Y_{k-1}) \bmod D \quad (8)$$

where $Y_{-1} = n_{RNTI} \neq 0$, A=39827, D=65537, and k=$\lfloor n_s/2 \rfloor$, $n_s$ is the slot number within a radio frame. If the CORESET is non-slot based scheduling, then k can be a function of slot number and/or OFDM symbol index for the corresponding CORESET. Alternatively, k can be a function of slot number and/or starting OFDM symbol index for the corresponding CORESET, and $Y_k$ can be defined differently for aggregation levels. To reduce blocking across different overlapping CORESETs, $Y_k$ can be derived from CORESET index, e.g., by setting $Y_{-1} = n_{RNTI}$+CORESET_ID. In another example, the $Y_k$ value is further indexed for each CORESET to use different values of A in the above equation as a function of the CORESET index. Further, the maximum number of overlapping CORESETs allowed may be pre-defined in the specification.

In embodiments, the RNTI value used for $n_{RNTI}$ is a UE ID that may be configured UE-specifically. In one embodiment, for common search spaces or group common DCIs, $Y_k$ can be set to 0. If the NR PDCCH candidates of the non-highest level aggregation level are defined contiguously inside the CCEs corresponding to the NR PDCCH candidates of the highest aggregation level, then $\pi_k(m) = m$ may be used for common search spaces.

In embodiments, if the PDCCH candidates of the non-highest level aggregation level are defined non-continuously inside the CCEs corresponding to the highest aggregation level, the randomization for NR PDCCH candidates may depend on the permutation function $\pi_k(\cdot)$. In embodiments, there may be multiple ways to define the permutation function. Table 1 illustrates one example for calculating permutation vector $\pi_k(\cdot)$.

TABLE 1

For calculating permutation vector $\pi_k(\cdot)$:
$\pi_k(0) = 0$, and define an intermediate vector T:
$T^1 = \{1, 2, \ldots, M^T - 1\} \rightarrow T^1(0) = 1, T^1(1) = 2, \ldots,$
$T^1(M^T - 2) = M^T - 1,$ TABLE 1-continued where $M^T = \left\lfloor \frac{N_{CCE,k}^L}{L} \right\rfloor$, $Z_0 = Y_k$,
j = 1,
A = 39827, D = 65537, (A and D can be different prime numbers)
While $\{j < M^T - 1\}$
  $Z_j = (A \cdot Z_{j-1}) \bmod D$
  $P_j = Z_j \bmod (M^T - j)$
  $\pi_D(j) = T^j(P_j)$;
  k = 0
  while $\{k < M^T - j - 1\}$
  if k < $P_j$ + 1
    $T^{j+1}(k) = T^j(k)$
  else
    $T^{j+1}(k) = T^j(k + 1)$
  k = k + 1
  end while
  j = j + 1;
end while.

In embodiments, another example for $\pi_k(\cdot)$ may be as given below in equation 9:

$$\pi_k(m) = \left\lfloor \frac{m \cdot N_{CCE,k}^L}{L \cdot M^L} \right\rfloor, \quad (9)$$

Where $M^L$ can be an integer number that can be fixed in the specification, configured for a UE.

In another example, the virtual CCEs corresponding to NR PDCCH candidate m of the search space $S_k^{(L)}$ of the non-highest aggregation level L may be given by equation 10:

$$S_k^{(L)} = L\left\{Y_k + \left\lfloor \frac{m \cdot N_{CCE,k}^L}{L \cdot M^L} \right\rfloor + \pi_k(m) + b \bmod \left\lfloor \frac{N_{CCE,k}^L}{L} \right\rfloor\right\} + i, \quad (10)$$

where $\pi_k(m)$ is defined as a permutation vector as described above in equation 9.

Further, in examples with the offset of the form $$\left\lfloor \frac{m \cdot N_{CCE,k}^L}{L \cdot M^L} \right\rfloor,$$

$M^L$ can be defined as either a configurable parameter on a CORESET-specific basis. Alternatively, $M^L$ can be defined as a function of the number of symbols in the CORESET such that, for a given aggregation level, the starting CCEs of the candidates are distributed farther apart for 3-symbol CORESET compared to 1- or 2-symbol CORESETs, etc., such that the candidates across CORESETs with different number of symbols are aligned thereby reducing the inter-CORESET blocking probability in case of overlapping CORESETs.

In other embodiments, search space may be based on the nested approach, and each NR PDCCH candidate may be located in the CCE domain in a non-contiguous manner In such embodiments, in order to satisfy the nested approach, the NR PDCCH candidates of the highest aggregation level may be randomly distributed over the whole CCE domain, or over the whole control resource set (CORESET) region. But for the NR PDCCH candidates of non-highest aggregation levels can be randomly distributed over the CCEs that are already occupied by the NR PDCCH candidates of the highest aggregation level.

Figure 3I:
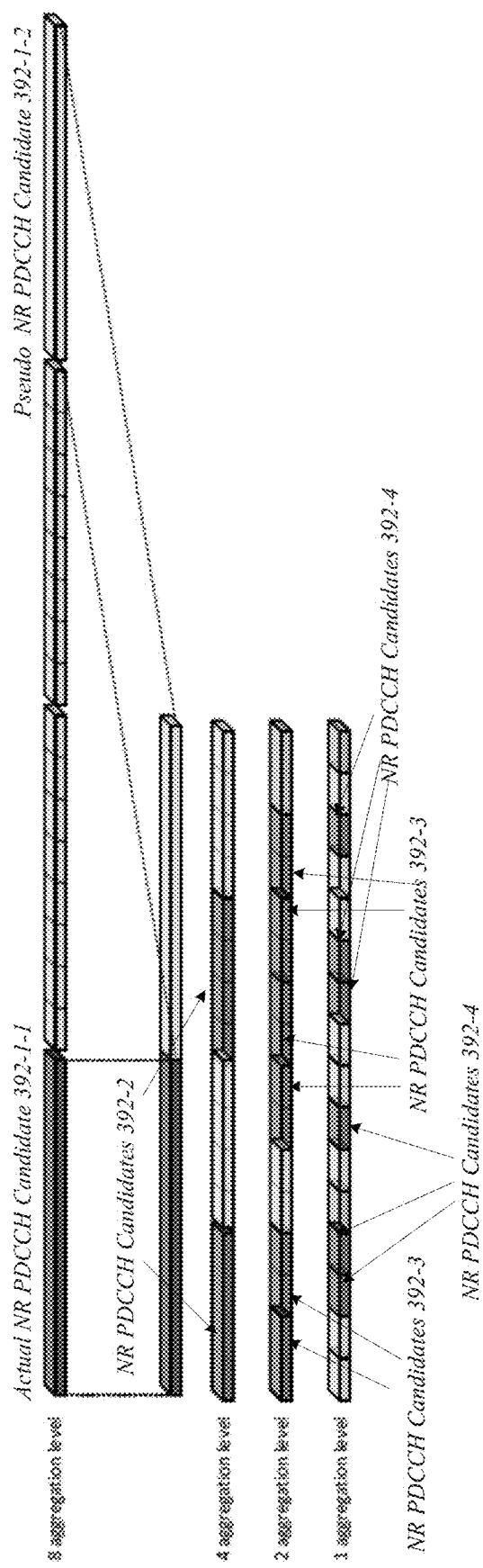

However, depending on the configuration of NR PDCCH candidates for each aggregation levels, it is possible that the number of CCEs required for the NR PDCCH candidates of the highest aggregation levels is smaller than the number of CCEs required for the NR PDCCH candidates of the non-highest aggregation levels. In this case, when the number of candidates is less, the nested approach cannot be achieved. In such a case, additional NR PDCCH candidates of the highest aggregation levels may be defined, and are pseudo NR PDCCH candidates of the highest aggregation level. These pseudo NR PDCCH candidates of the highest aggregation level can be defined for providing sufficient CCE numbers for the PDCCH candidates of the non-highest aggregation levels, but they are not actually monitored by the UE. FIG. 3I illustrates a case where there are pseudo NR PDCCH candidates, e.g., pseudo NR PDCCH Candidate 392-1-2, of the highest aggregation level.

With reference to FIG. 3I, in embodiments a UE may be configured to monitor 1, 2, 6, and 6 NR PDCCH candidates 392-1, 392-2, 392-3, and 392-4, for AL8, AL4, AL2, and AL1 respectively, and the total number of CCEs may be 32. The number of CCEs that are occupied by the NR PDCCH candidates 392-1 of the highest aggregation level is less than that of AL2 and AL1. Therefore, additional pseudo NR PDCCH candidates of the highest aggregation level may be defined. In embodiments, the pseudo NR PDCCH candidates of the highest aggregation level may not be monitored by the UE, but its CCE may be used for the determination of NR PDCCH candidates of the non-highest aggregation levels.

In embodiments, there are multiple ways to define the number of pseudo NR PDCCH candidates of the highest aggregation level. The actual NR PDCCH candidates are the PDCCH candidates that are actually monitored by the UE.

In a first option, the number of total NR PDCCH candidates of the highest aggregation level is fixed, e.g., 2 PDCCH candidates for AL8. In this case, the UE has to be configured such that the number of CCEs for the non-highest aggregation levels should be smaller than the number of CCEs for total PDCCH candidates of the highest aggregation levels. Further, the number of actual NR PDCCH candidates of the highest aggregation level should be smaller than or equal to the number of total NR PDCCH candidates of the highest aggregation level.

In a second option, the number of total PDCCH candidates of the highest aggregation level is also configured in addition to the number of actual NR PDCCH candidates of the highest aggregation level, e.g., 2 total NR PDCCH candidates and 1 actual NR PDCCH candidate for AL8.

In a third option, the number of pseudo NR PDCCH candidates of the highest aggregation level is also configured in addition to the number of actual NR PDCCH candidates of the highest aggregation level, e.g., 1 pseudo NR PDCCH candidates and 1 actual NR PDCCH candidate for AL8. In this case, the total NR PDCCH candidates will be the sum of the actual NR PDCCH candidates and the pseudo NR PDCCH candidates.

In embodiments, the CCEs corresponding to NR PDCCH candidate m of the search space $S_k^{(L)}$ of the highest aggregation level $L^{Highest}$ are given by equation 11:

$$S_k^{(L)} = L\left\{Y_k + \pi_k(m) + b) \bmod \left\lfloor \frac{N_{CCE,k}^L}{L} \right\rfloor\right\} + i, \quad (11)$$

where $Y_k$ is defined below i=0, ..., L−1 and m=0, $M^{L\_total}$−1 $M^{L\_total}$ is the number of total NR PDCCH candidates of the highest aggregation level. Moreover, the UE monitors NR PDCCH candidate m, where m=0, ..., $M^{L\_actual}$ in the given search space, where $M^{L\_actual}$ is the number of actual NR PDCCH candidates of the highest aggregation level and $M^{L\_actual} \leq M^{L\_total}$. The variable b can be used for carrier aggregation case, e.g., $b = M^L \times n_{CI}$ where $n_{CI}$ is the carrier indicator field, and/or b can include other information, e.g., CORESET index. Further, $N_{CCE,k}^L$ is the total number of CCEs in the CORESET of slot$^k$. Further, equation 12 defines $Y_k$:

$$Y_k = (A \cdot Y_{k-1}) \bmod D \quad (12),$$

where $Y_{-1} = n_{RNTI} \neq 0$, A=39827, D=65537 and $$K = \left\lfloor \frac{n_s}{2} \right\rfloor.$$

The $n_s$ value is the slot number within a radio frame. If the CORESET is non-slot based scheduling, then k can be a function of slot number and/or OFDM symbol index for the corresponding CORESET. Alternatively, k can be a function of slot number and/or starting OFDM symbol index for the corresponding CORESET. Moreover, $Y_k$ can be defined for aggregation levels. To reduce blocking across different overlapping CORESETs, $Y_k$ can be derived from CORESET index, e.g., by setting $Y_{-1} = n_{RNTI} + CORESET\_ID$. In another example, the $Y_k$ value is further indexed for each CORESET to use different values of A in the above equation as a function of the CORESET index. Further, the maximum number of overlapping CORESETs allowed may be predefined in the specification.

The RNTI value for $n_{RNTI}$ is a UE ID that may be configured UE-specifically.

In one embodiment, for common search space or group common DCIs, $Y_k$ can be set to 0 and $\pi_k(\cdot)$ can be the pseudo-randomly permutated (sorted) sequence from $$\left\{0, 1, 2, \ldots, \left\lfloor \frac{N_{CCE,k}^L}{L} \right\rfloor - 1\right\}.$$

For Example, if $$\left\lfloor \frac{N_{CCE,k}^L}{L} \right\rfloor = 8,$$

$\pi_0(\cdot) = \{0, 1, 2, 3, 4, 5, 6, 7\}$,
$\pi_1(\cdot) = \{0, 5, 3, 7, 1, 6, 2, 4\}$, and
$\pi_2(\cdot) = \{0, 3, 4, 7, 6, 5, 2, 1\}$.

For the nested approach, the CCEs that are used for NR PDCCH candidates of the highest aggregation level $L^{Highest}$ can be indexed to generate the virtual CCEs. If the highest aggregation level is 8 and the number of NR PDCCH candidates for AL8 is 2 then the number of virtual CCE can be 16. And the virtual CCEs are indexed from 0 to 15. The virtual CCE index can be different from the actual CCE index.

In embodiments, the virtual CCEs corresponding to PDCCH candidate m of the search space $S_k^{(L)}$ of the non-highest aggregation level L are given by equation 13:

$$S_k^{(L)} = L\left\{\left(Y_k + \pi_k(m) + b\right) \bmod \left\lfloor \frac{N_{CCE,k}^L}{L} \right\rfloor\right\} + i, \quad (13)$$

where $Y_k$ is defined below, i=0, . . . , L−1 and m=0, . . . , $M^L$−1. $M^L$ is the number of PDCCH candidates of the aggregation level of L to monitor in the given search space. The value $N_{CCE,k}^L$ is $L^{Highest} \times 1 \ M^{L\_total}$ and $\pi_k(\cdot)$ can be the pseudo-randomly permutated (sorted) sequence from $$\left\{0, 1, 2, \ldots, \left\lfloor \frac{N_{CCE,k}^L}{L} \right\rfloor - 1\right\}.$$

Equation 14 defines $Y_k$:

$$Y_k = (A \cdot Y_{k-1}) \bmod D \quad (14),$$

where $Y_{-1} = n_{RNTI} \neq 0$, A=39827, D=65537 and $$K = \left\lfloor \frac{n_s}{2} \right\rfloor,$$

and the value $n_s$ is the slot number within a radio frame. If the CORESET is non-slot based scheduling, then k can be a function of slot number and/or OFDM symbol index for the corresponding CORESET. And $Y_k$ can be defined differently for aggregation levels. $Y_k$ can be derived from CORESET index, e.g., by setting $Y_{-1} = n_{RNTI} + \text{CORESET\_ID}$.

The RNTI value for $n_{RNTI}$ is a UE ID that may be configured UE-specifically.

In one embodiment, for common search space or group common DCIs, $Y_k$ can be set to 0.

In embodiments, the randomization for NR PDCCH candidates depend on the permutation function $\pi_k(\cdot)$. There can be multiple ways to define it and one example is shown below in table 2.

TABLE 2

For calculating permutation vector $\pi_k (\bullet)$:
$\pi_0(0) = 0$, and define and intermediate vector T
$T^1 = \{1, 2, \ldots, M^T - 1\} \rightarrow T^1(0) = 1, T^1(1) = 2, \ldots,$
$T^1(M^T - 2) = M^T - 1,$
where $M = \left\lfloor \dfrac{N_{CCE,k}^L}{L} \right\rfloor$
$Z_0 = Y_k$
j = 1
A = 39827, D = 65537 (A and D can be different prime numbers)
While $\{j < M^T - 1\}$
    $Z_j = (A \cdot Z_{j-1}) \bmod D$
    $P_j = Z_j \bmod (M^T - j)$
    $\pi_D(j) = T^j(P_j);$
    k = 0
    while $\{k < M^T - j - 1\}$
    if $k < P_j + 1$
    $T^{j+1}(k) = T^j(k)$
    else
    $T^{j+1}(k) = T^j(k + 1)$
    k = k + 1
    end while
    j = j + 1;
end while In another example $\pi_k(\cdot)$ is given below in equation (15)

$$\pi_k(m) = \left\lfloor \frac{m \cdot N_{CCE,k}^L}{L \cdot M^L} \right\rfloor, \quad (15)$$

where $M^L$ can be an integer number that can be fixed in the specification, configured for a UE.

In another example, the virtual CCEs corresponding to PDCCH candidate m of the search space $S_k^{(L)}$ of the non-highest aggregation level L are given by equation 16:

$$S_k^{(L)} = L\left\{\left(Y_k + \left\lfloor \frac{m \cdot N_{CCE,k}^L}{L \cdot M^L} \right\rfloor + \pi_k(m) + b\right) \bmod \left\lfloor \frac{N_{CCE,k}^L}{L} \right\rfloor\right\} + i, \quad (16)$$

where $\pi_k(m)$ is defined as a permutation vector as described above in equation 15.

In some embodiments, with the offset of the form $$\left\lfloor \frac{m \cdot N_{CCE,k}^L}{L \cdot M^L} \right\rfloor,$$

the value $M^L$ can be defined as a configurable parameter on a CORESET-specific basis. Alternatively, $M^L$ can be defined as a function of the number of symbols in the CORESET such that, for a given aggregation level, the starting CCEs of the candidates are distributed farther apart for 3-symbol CORESET compared to 1- or 2-symbol CORESETs, etc., such that the candidates across CORESETs with different number of symbols are aligned thereby reducing the inter-CORESET blocking probability in case of overlapping CORESETs.

In embodiments, based on the nested approach, each NR PDCCH candidates can be located in the CCE domain In order to satisfy the nested approach, the NR PDCCH candidates of the highest aggregation level can be randomly distributed over the whole CCE domain, or over the whole control resource set (CORESET) region. But for the NR PDCCH candidates of non-highest aggregation levels can be randomly distributed over the CCEs that are already occupied by the NR PDCCH candidates of the highest aggregation level. Here since the aggregation levels can be configured differently for each user, the highest aggregation level and non-highest aggregation level are also differently defined for each user.

For example, a NR PDCCH UE-specific search space $S_k^{(L)}$ at CCE aggregation level $L \in \{1, 2, 4, 8, 16\}$ is defined by a set of NR PDCCH candidates for CCE aggregation level L.

If $L = L_{max}$, where $L_{max}$ is the largest aggregation level configured for the UE, for a control resource set$_p$, the CCEs corresponding to PDCCH candidate m of the search space for a serving cell corresponding to carrier indicator field value $n_{CI}$ are given by equation 17:

$$S_k^{(L)} = L\left\{\left(Y_{p,k_p} + \left\lfloor \frac{m_{n_{CI}} \cdot N_{CCE,p}}{L \cdot M_{p,max}^{(L)}} \right\rfloor + n_{CI}\right) \bmod \left\lfloor \frac{N_{CCE,p}}{L} \right\rfloor\right\} + i. \quad (17)$$

The CCEs that are used for NR PDCCH candidates of the highest aggregation level $L_{max}$ can be indexed to generate the virtual CCEs. For example, if the highest aggregation level is 8 and the number of PDCCH candidates for AL8 is 2 then the number of virtual CCE can be 16. And the virtual CCEs are indexed from 0 to 15. The virtual CCE index can be different from the actual CCE index but have a 1:1 mapping between virtual CCEs and actual CCEs that are used for the NR PDCCH candidates of the highest aggregation level $L_{max}$ including pseudo NR PDCCH candidates.

However, if $L<L_{max}$, for a control resource set$_p$, the virtual CCEs corresponding to NR PDCCH candidate $m_{n_{CI}}$ of the search space for a serving cell corresponding to carrier indicator field value $n_{CI}$ are given by equation 18:

$$S_k^{(L)} = L \left\{ \left( Y_{p,k_p} + \left\lfloor \frac{m_{n_{CI}} \cdot \left( L_{max} \cdot M_{p,n_{CI}}^{(L_{max},pseudo)} \right)}{L \cdot M_{p,n_{CI}}^{(L)}} \right\rfloor + n_{CI} \right) \mod \left\lfloor \frac{\left( L_{max} \cdot M_{p,n_{CI}}^{(L_{max},pseudo)} \right)}{L} \right\rfloor \right\} + i, \quad (18)$$

where for any common search space, $Y_{p,k_p}=0$. For a UE-specific search space, $Y_{p,k_p}=(A_p \cdot Y_{p,k_p-1}) \mod D$, $Y_{p,-1}=n_{RNTI} \neq 0$, $A_0=39827$, $A_1=39829$, and $D=65537$; $i=0, \ldots, L-1$; $n_{CI}$ is the carrier indicator field value if the UE is configured with a carrier indicator field for the serving cell on which NR PDCCH is monitored.

Otherwise, for any common search space, $n_{CI}=0$; $N_{CCE,p}$ is the number of CCEs, numbered from 0 to $N_{CCE,p}-1$, in control resource set$_p$; $m_{n_{CI}}=0, \ldots, M_{p,n_{CI}}^{(L)}-1$, where $M_{p,n_{CI}}^{(L)}$ is the number of NR PDCCH candidates, the UE is configured to monitor for aggregation level L for a serving cell corresponding to $n_{CI}$;

for any common search space, $M_{p,max}^{(L)}=M_{p,0}^{(L)}$;

for a UE-specific search space, $M_{p,max}^{(L)}$ is the maximum of $M_{p,n_{CI}}^{(L)}$ corresponding DCI formats overall configured $n_{CI}$ values for a CCE aggregation level L in control resource set p; the RNTI value can be used for $n_{RNTI}$, and $M_{p,n_{CI}}^{(L_{max},pseudo)}$ can be the sum of the number of NR PDCCH candidates the UE is configured to monitor for aggregation level $L_{max}$ and the number of pseudo PDCCH candidates.

The number of pseudo NR PDCCH candidates can be explicitly configured, or implicitly determined by the configuration, where the number of pseudo PDCCH candidates can be 0.

One example of the implicit number of pseudo PDCCH candidates of the highest aggregation level can be determined by the following equation 19:

$$M_{p,n_{CI}}^{(L_{max},pseudo)} = M_{p,n_{CI}}^{(L_{max})} + \max\left( 0, \left\lceil \frac{L_{max-1} M_{p,n_{CI}}^{(L_{max-1})} - L_{max} M_{p,n_{CI}}^{(L_{max})}}{L_{max}} \right\rceil, \ldots, \left\lceil \frac{M_{p,n_{CI}}^{(1)} - L_{max} M_{p,n_{CI}}^{(L_{max})}}{L_{max}} \right\rceil \right). \quad (19)$$

FIG. 4A illustrates an example of a logic flow 400 that may be representative of some or all of the operations executed by one or more embodiments described herein. For example, the logic flow 400 may illustrate operations performed by a system including a base station to assign PDCCH candidates, as described herein.

At block 405, the logic flow 400 may include determining physical downlink control channel (PDCCH) candidates to assign to a user equipment (UE) based on one or more aggregation levels. For example, each PDCCH candidate in a highest aggregation level of the one or more aggregation levels can be assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level. The highest aggregation level may be most number CCEs aggregated to define a set of PDCCH candidates. For example, the set of aggregation levels Ls may be defined as $L \in \{1, 2, 4, 8, 16\}$, where the highest aggregation level includes 16 CCEs aggregated together. The non-highest aggregation levels may include any aggregation level other than the highest aggregation level, e.g., aggregation level 1, 2, 4, or 8.

Further and at block 410, the logic flow 400 includes selecting at least one of the PDCCH candidates to utilize to send downlink control information (DCI) to the UE. At block 415, the logic flow 400 includes cause transmission of the DCI to the UE via the PDCCH candidates selected.

FIG. 4B illustrates an example of a logic flow 450 that may be representative of some or all of the operations executed by one or more embodiments described herein. For example, the logic flow 450 may illustrate operations performed by a system including a base station to assign PDCCH candidates, as described herein.

At block 455, the logic flow 450 may include determining physical downlink control channel (PDCCH) candidates to monitor based on one or more aggregation levels. For example, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level. For example, the set of aggregation levels Ls may be defined as $L \in \{1, 2, 4, 8, 16\}$, where the highest aggregation level includes 16 CCEs aggregated together. The non-highest aggregation levels may include any aggregation level other than the highest aggregation level, e.g., aggregation level 1, 2, 4, or 8.

Further and at block 460, the logic flow 450 includes monitoring the PDCCH candidates to receive downlink control information (DCI) from a base station. At block 465, the logic flow 450 includes receiving, from the base station, the DCI via at least one of the PDCCH candidates.

FIG. SA illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement one or more of embodiments discussed herein, such as logic flow 400. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 5A:
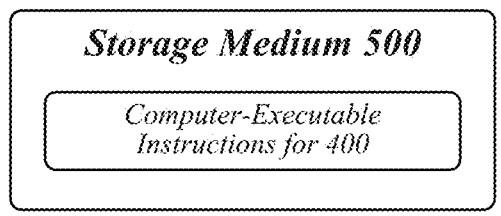
FIG. 5A illustrates an example of a first storage medium.
Figure 5B:
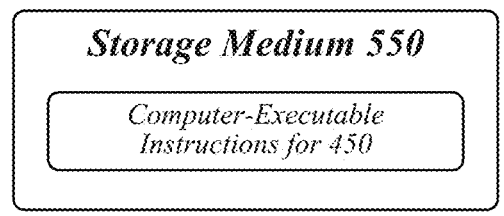
FIG. 5B illustrates an example of a second storage medium.

FIG. 5B illustrates an embodiment of a storage medium 550. Storage medium 550 may comprise any non-transitory computer-readable storage medium or machine-readable storage medium, such as an optical, magnetic or semiconductor storage medium. In various embodiments, storage medium 550 may comprise an article of manufacture. In some embodiments, storage medium 550 may store computer-executable instructions, such as computer-executable instructions to implement one or more of embodiments discussed herein, such as logic flow 450. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 6:
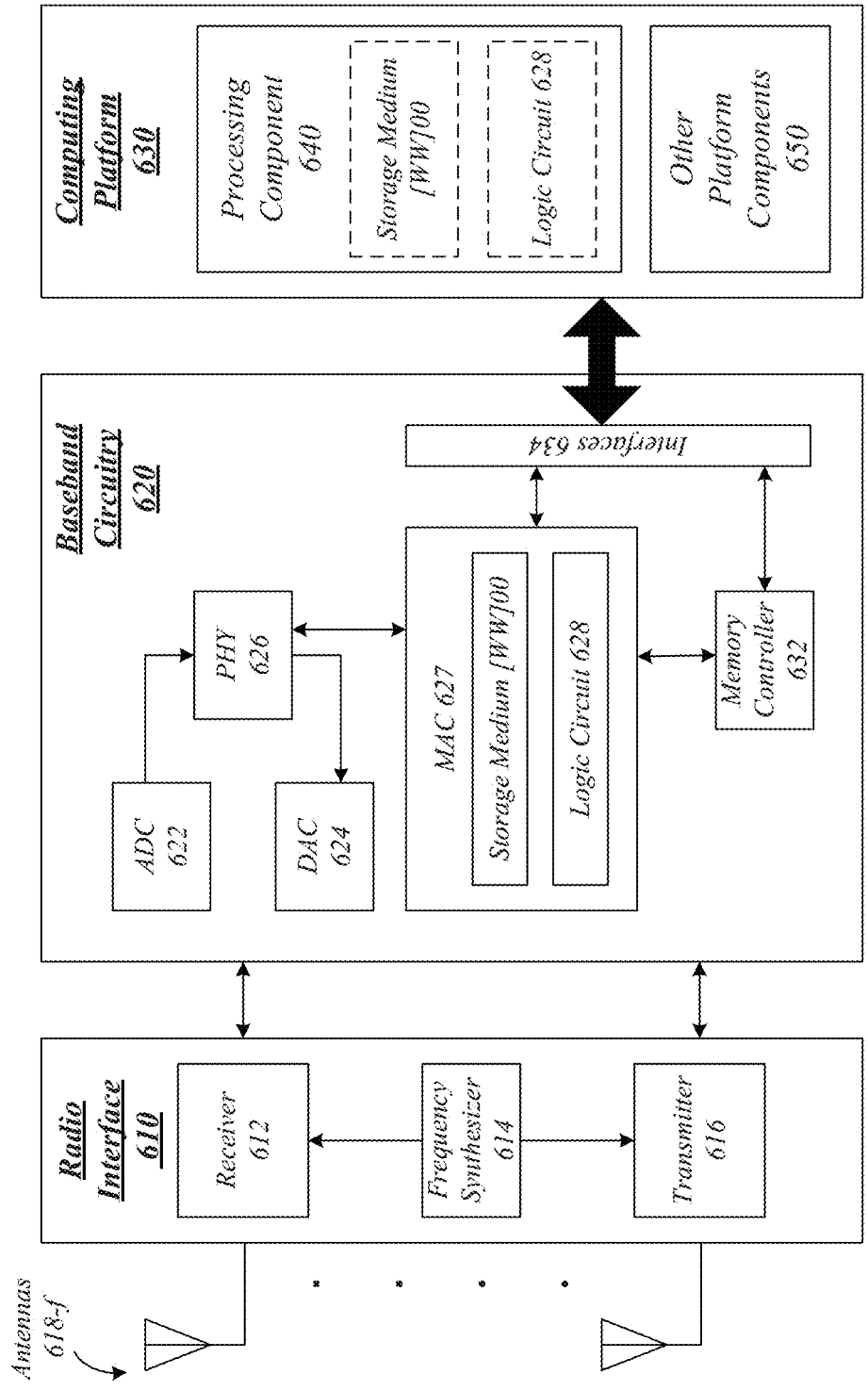
FIG. 6 illustrates an example of a device.

FIG. 6 illustrates an embodiment of a communications device 600 that may implement one or more of embodiments discussed herein, such as UE 100, logic flow 450, storage medium 550, and so forth. In various embodiments, device 600 may comprise a logic circuit 628. The logic circuit 628 may include physical circuits to perform operations described for one or more of UE 100, logic flow 450, storage medium 550, and so forth. As shown in FIG. 6, device 600 may include a radio interface 610, baseband circuitry 620, and computing platform 630, although the embodiments are not limited to this configuration.

The device 600 may implement some or all of the structure and/or operations for one or more of UE 100, logic flow 450, storage medium 550, and so forth, and logic circuit 628 in a single computing entity, such as entirely within a single device. Alternatively, the device 600 may distribute portions of the structure and/or operations for one or more of UE 100, logic flow 450, storage medium 550, and so forth, and logic circuit 628 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 610 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-1-DMA) symbols) although the embodiments are not limited to any specific over-the-air interface or modulation scheme. Radio interface 610 may include, for example, a receiver 612, a frequency synthesizer 614, and/or a transmitter 616. Radio interface 610 may include bias controls, a crystal oscillator and/or one or more antennas 618-f. In another embodiment, radio interface 610 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 620 may communicate with radio interface 610 to process receive and/or transmit signals and may include, for example, a mixer for down-converting received RF signals, an analog-to-digital converter 622 for converting analog signals to digital form, a digital-to-analog converter 624 for converting digital signals to analog form, and a mixer for up-converting signals for transmission. Further, baseband circuitry 620 may include a baseband or physical layer (PHY) processing circuit 626 for PHY link layer processing of respective receive/transmit signals. Baseband circuitry 620 may include, for example, a medium access control (MAC) processing circuit 627 for MAC/data link layer processing. Baseband circuitry 620 may include a memory controller 632 for communicating with MAC processing circuit 627 and/or a computing platform 630, for example, via one or more interfaces 634.

In some embodiments, PHY processing circuit 626 may include a frame construction and/or detection module, in combination with additional circuitry such as a buffer memory, to construct and/or deconstruct communication frames. Alternatively or in addition, MAC processing circuit 627 may share processing for certain of these functions or perform these processes independent of PHY processing circuit 626. In some embodiments, MAC and PHY processing may be integrated into a single circuit.

The computing platform 630 may provide computing functionality for the device 600. As shown, the computing platform 630 may include a processing component 640. In addition to, or alternatively of, the baseband circuitry 620, the device 600 may execute processing operations or logic for one or more of UE 100, logic flow 450, storage medium 550, and so forth, and logic circuit 628 using the processing component 640. The processing component 640 (and/or PHY 626 and/or MAC 627) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 630 may further include other platform components 650. Other platform components 650 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 600 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 600 described herein, may be included or omitted in various embodiments of device 600, as suitably desired.

Embodiments of device 600 may be implemented using single input single output (SISO) architectures. However, certain implementations may include multiple antennas (e.g., antennas 618-f) for transmission and/or reception using adaptive antenna techniques for beamforming or spatial division multiple access (SDMA) and/or using MIMO communication techniques.

The components and features of device 600 may be implemented using any combination of discrete circuitry, application specific integrated circuits (ASICs), logic gates and/or single chip architectures. Further, the features of device 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 7:
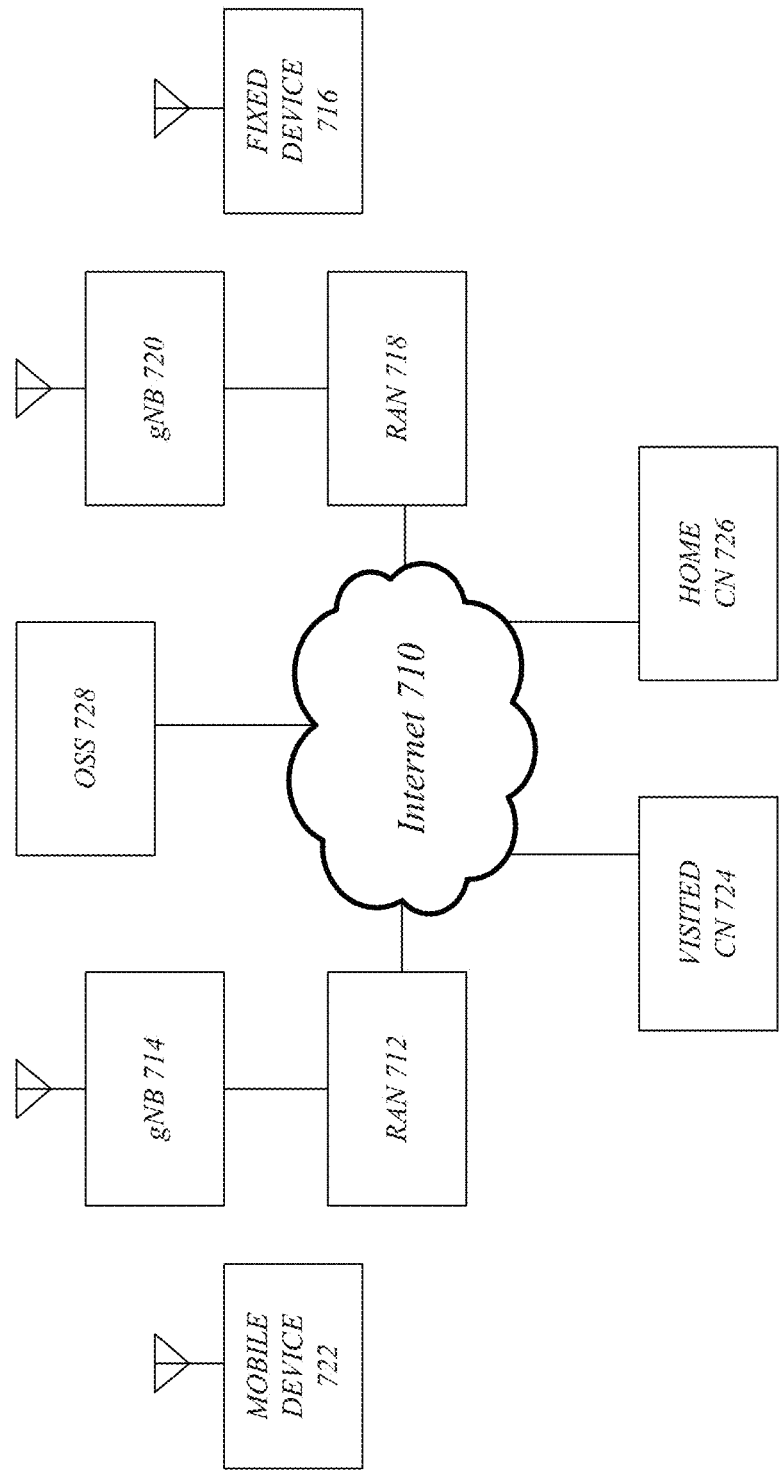
FIG. 7 illustrates an example of a broadband wireless access system.

FIG. 7 illustrates an embodiment of a broadband wireless access system 700. As shown in FIG. 7, broadband wireless access system 700 may be an internet protocol (IP) type network comprising an internet 710 type network or the like that is capable of supporting mobile wireless access and/or fixed wireless access to internet 710. In one or more embodiments, broadband wireless access system 700 may comprise any type of orthogonal frequency division multiple access (OFDMA)-based or single-carrier frequency division multiple access (SC-FDMA)-based wireless network, such as a system compliant with one or more of the 5G NR Specifications and/or IEEE 802.16 Standards, and the scope of the claimed subject matter is not limited in these respects.

In the exemplary broadband wireless access system 700, radio access networks (RANs) 712 and 718 are capable of coupling with next generation node Bs (gNBs) 714 and 720, respectively, to provide wireless communication between one or more fixed devices 716 and internet 710 and/or between or one or more mobile devices 722 and Internet 710. One example of a fixed device 716 and a mobile device 722 is device 600 of FIG. 6, with the fixed device 716 comprising a stationary version of device 600 and the mobile device 722 comprising a mobile version of device 600. RANs 712 and 718 may implement profiles that are capable of defining the mapping of network functions to one or more physical entities on broadband wireless access system 700. gNBs 714 and 720 may comprise radio equipment to provide RF communication with fixed device 716 and/or mobile device 722, such as described with reference to device 600, and may comprise, for example, the PHY and MAC layer equipment in compliance with a 3GPP LTE Specification, 5G NR Specification, and/or an IEEE 802.16 Standard. gNBs 714 and 720 may further comprise an IP backplane to couple to Internet 710 via RANs 712 and 718, respectively, although the scope of the claimed subject matter is not limited in these respects.

Broadband wireless access system 700 may further comprise a visited core network (CN) 724 and/or a home CN 726, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 724 and/or home CN 726, and the scope of the claimed subject matter is not limited in these respects. Visited CN 724 may be referred to as a visited CN in the case where visited CN 724 is not part of the regular service provider of fixed device 716 or mobile device 722, for example where fixed device 716 or mobile device 722 is roaming away from its respective home CN 726, or where broadband wireless access system 700 is part of the regular service provider of fixed device 716 or mobile device 722 but where broadband wireless access system 700 may be in another location or state that is not the main or home location of fixed device 716 or mobile device 722. The embodiments are not limited in this context.

Fixed device 716 may be located anywhere within range of one or both of gNBs 714 and 720, such as in or near a home or business to provide home or business customer broadband access to Internet 710 via gNBs 714 and 720 and RANs 712 and 718, respectively, and home CN 726. It is worthy of note that although fixed device 716 is generally disposed in a stationary location, it may be moved to different locations as needed. Mobile device 722 may be utilized at one or more locations if mobile device 722 is within range of one or both of gNBs 714 and 720, for example. In accordance with one or more embodiments, operation support system (OSS) 728 may be part of broadband wireless access system 700 to provide management functions for broadband wireless access system 700 and to provide interfaces between functional entities of broadband wireless access system 700. Broadband wireless access system 700 of FIG. 7 is merely one type of wireless network showing a certain number of the components of broadband wireless access system 700, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

In a first example, a system, a device, an apparatus, and so forth may include memory, of a base station, to store executable computer instructions, and processing circuitry, of the base station, coupled with the memory, the processing circuitry operable to execute the computer instructions, that when executed, enable the processing circuitry to determine physical downlink control channel (PDCCH) candidates to assign to a user equipment (UE) based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level, select at least one of the PDCCH candidates to utilize to send downlink control information (DCI) to the UE, and cause transmission of the DCI to the UE via the PDCCH candidates selected.

In a second example and in furtherance of the first example, the system, the device, the apparatus, and so forth including processing circuitry to process each of the one or more aggregation levels includes a number of control channel elements (CCEs) and an aggregation level L of the one or more aggregation levels is L∈{1, 2, 4, 8, 16} indicating the number of CCEs for the aggregation level L.

In a third example and in furtherance of any previous example, the system, the device, the apparatus, and so forth including processing circuitry to process an aggregation level L of the one or more aggregation levels is L∈{1, 2, 4, 8, 16}, and the highest aggregation level includes 16 control channel elements (CCEs), and the one or more non-highest aggregation levels include less than 16 CCEs.

In a fourth example and in furtherance of any previous example, the system, the device, the apparatus, and so forth including the processing circuitry to determine control channel elements (CCEs) corresponding to a PDCCH candidate $m_{n_{CI}}$ of the PDCCH candidates to assign in the highest aggregation level defined in a search space $S_k^{(L)}$, wherein $$S_k^{(L)} = L\left\{\left(Y_{p,k_p} + \left\lfloor\frac{m_{n_{CI}} \cdot N_{CCE,p}}{L \cdot M_{p,max}^{(L)}}\right\rfloor + n_{CI}\right) \mod \left\lfloor\frac{N_{CCE,p}}{L}\right\rfloor\right\} + i,$$

where for any common search space $Y_{p,k_p}=0$ and a UE-specific search space $Y_{p,k_p}=(A_p \cdot Y_{p,k_p-1}) \mod D$, $Y_{p,-1}=n_{RNTI}\neq 0$, $A_0=39827$, $A_1=39829$, and $D=65537$; i=0, ..., L−1; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_p^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

In a fifth example and in furtherance of any previous example, the system, the device, the apparatus, and so forth including the processing circuitry to generate a virtual index of the CCEs corresponding to the PDCCH candidate $m_{n_{CI}}$ of the PDCCH candidates assigned in the highest aggregation level to generate virtual CCEs, wherein the virtual index of the virtual CCEs to have a 1:1 mapping with an index for the CCEs.

In a sixth example and in furtherance of any previous example, the system, the device, the apparatus, and so forth including the processing circuitry to determine virtual CCEs corresponding to a PDCCH candidate $m_{n_{CI}}$ of the PDCCH candidates to assign in the non-highest aggregation level defined in a search space $S_k^{(L)}$, wherein $$S_k^{(L)} = L\left\{\left(Y_{p,k_p} + \left\lfloor\frac{m_{n_{CI}} \cdot \left(L_{max} \cdot M_{p,n_{CI}}^{(L_{max},pseudo)}\right)}{L \cdot M_{p,n_{CI}}^{(L)}}\right\rfloor + n_{CI}\right) \mod \left\lfloor\frac{\left(L_{max} \cdot M_{p,n_{CI}}^{(L_{max},pseudo)}\right)}{L}\right\rfloor\right\} + i,$$

where for any common search space $Y_{p,k_p}=0$ and a UE-specific search space $Y_{p,k_p}=(A_p \cdot Y_{p,k_p-1}) \mod D$, $Y_{p,-1}=n_{RNTI}\neq 0$, $A_0=39827$, $A_1=39829$, and $D=65537$; i=0, ..., L−1; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_p^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

In a seventh example and in furtherance of any previous example, the system, the device, the apparatus, and so forth including Radio Frequency (RF) circuitry of the base station, front-end module (FEM) circuitry of the base station, and one or more antennas of the base station, the RF circuitry, FEM circuitry, and the one or more antennas coupled with the memory and the processing circuitry, and the processing circuitry to cause transmission of the DCI to the UE via the PDCCH candidates selected via the RF circuitry, FEM circuitry, and the one or more antennas.

In an eighth example and in furtherance of any previous example, the system, the device, the apparatus, and so forth including memory, of a user equipment (UE), to store executable computer instructions processing circuitry, of the UE, coupled with the memory, the processing circuitry operable to execute the computer instructions, that when executed, enable the processing circuitry to determine physical downlink control channel (PDCCH) candidates to monitor based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level monitor the PDCCH candidates to receive downlink control information (DCI) from a base station, and receive, from the base station, the DCI via at least one of the PDCCH candidates.

In a ninth example and in furtherance of any previous example, the system, the device, the apparatus, and so forth including processing circuitry to process each of the one or more aggregation levels includes a number of control channel elements (CCEs) and an aggregation level L of the one or more aggregation levels is L∈{1, 2, 4, 8, 16} indicating the number of CCEs for the aggregation level L.

In a tenth example and in furtherance of any previous example, the system, the device, the apparatus, and so forth including an aggregation level L of the one or more aggregation levels is L∈{1, 2, 4, 8, 16}, and the highest aggregation level includes 16 control channel elements (CCEs) and the one or more non-highest aggregation levels include less than 16 CCEs.

In an eleventh example and in furtherance of any previous example, the system, the device, the apparatus, and so forth including the processing circuitry to determine control channel elements (CCEs) corresponding to a PDCCH candidate $m_{n_{CI}}$ of the PDCCH candidates to monitor in the highest aggregation level defined in a search space $S_k^{(L)}$, wherein $$S_k^{(L)} = L\left\{\left(Y_{p,k_p} + \left\lfloor \frac{m_{n_{CI}} \cdot N_{CCE,p}}{L \cdot M_{p,max}^{(L)}} \right\rfloor + n_{CI}\right) \bmod \lfloor N_{CCE,p}/L \rfloor\right\} + i,$$

where for any common search space $Y_{p,k_p}=0$ and a UE-specific search space $Y_{p,k_p}=(A_p \cdot Y_{p,k_p-1}) \bmod D$, $Y_{p,-1}=n_{RNTI}\neq 0$, $A_0=39827$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,n_{CI}}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

In an twelfth example and in furtherance of any previous example, the system, the device, the apparatus, and so forth including the processing circuitry to determine virtual CCEs corresponding to a PDCCH candidate $m_{n_{CI}}$ of the PDCCH candidates to monitor in the non-highest aggregation level defined in a search space $S_k^{(L)}$, wherein $$S_k^{(L)} = L\left\{\left(Y_{p,k_p} + \left\lfloor \frac{m_{n_{CI}} \cdot \left(L_{max} \cdot M_{p,n_{CI}}^{(L_{max},pseudo)}\right)}{L \cdot M_{p,n_{CI}}^{(L)}} \right\rfloor + n_{CI}\right) \bmod \left\lfloor \frac{\left(L_{max} \cdot M_{p,n_{CI}}^{(L_{max},pseudo)}\right)}{L} \right\rfloor\right\} + i,$$

where for any common search space $Y_{p,k_p}=0$ and a UE-specific search space $Y_{p,k_p}=(A_p \cdot Y_{p,k_p-1}) \bmod D$, $Y_{p,-1}=n_{RNTI}\neq 0$, $A_0=39827$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

In a thirteenth example and in furtherance of any previous example, the system, the device, the apparatus, and so forth including Radio Frequency (RF) circuitry of the UE, front-end module (FEM) circuitry of the UE, and one or more antennas of the UE, the RF circuitry, FEM circuitry, and the one or more antennas coupled with the memory and the processing circuitry, and the processing circuitry receive the DCI from the base station via the RF circuitry, FEM circuitry, and the one or more antennas.

In a fourteenth example and in furtherance of any previous example, a non-transitory computer-readable storage medium, comprising a plurality of instructions, that when executed, enable processing circuitry of a base station to determine physical downlink control channel (PDCCH) candidates to assign to a user equipment (UE) based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level, select at least one of the PDCCH candidates to utilize to send downlink control information (DCI) to the UE, and cause transmission of the DCI to the UE via the PDCCH candidates selected.

In a fifteenth example and in furtherance of any previous example, a non-transitory computer-readable storage medium, comprising a plurality of instructions, that when executed, enable processing circuitry of a base station to process each of the one or more aggregation levels includes a number of control channel elements (CCEs) and an aggregation level L of the one or more aggregation levels is L∈{1, 2, 4, 8, 16} indicating the number of CCEs for the aggregation level L.

In a sixteenth example and in furtherance of any previous example, a non-transitory computer-readable storage medium, comprising a plurality of instructions, that when executed, enable processing circuitry of a base station to process an aggregation level L of the one or more aggregation levels is L∈{1, 2, 4, 8, 16}, and the highest aggregation level includes 16 control channel elements (CCEs), and the one or more non-highest aggregation levels include less than 16 CCEs.

In a seventeenth example and in furtherance of any previous example, a non-transitory computer-readable storage medium, comprising a plurality of instructions, that when executed, enable processing circuitry of a base station to determine control channel elements (CCEs) corresponding to a PDCCH candidate $m_{n_{CI}}$ of the PDCCH candidates to assign in the highest aggregation level defined in a search space $S_k^{(L)}$, wherein $$S_k^{(L)} = L\left\{\left(Y_{p,k_p} + \left\lfloor \frac{m_{n_{CI}} \cdot N_{CCE,p}}{L \cdot M_{p,max}^{(L)}} \right\rfloor + n_{CI}\right) \bmod \lfloor N_{CCE,p}/L \rfloor\right\} + i,$$

where for any common search space $Y_{p,k_p}=0$ and a UE-specific search space $Y_{p,k_p}=(A_p \cdot Y_{p,k_p-1}) \bmod D$, $Y_{p,-1}=n_{RNTI} \neq 0$, $A_0=39827$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,n_{CI}}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

In an eighteenth example and in furtherance of any previous example, a non-transitory computer-readable storage medium, comprising a plurality of instructions, that when executed, enable processing circuitry of a base station to generate a virtual index of the CCEs corresponding to the PDCCH candidate $m_{n_{CI}}$ of the PDCCH candidates assigned in the highest aggregation level to generate virtual CCEs, wherein the virtual index of the virtual CCEs to have a 1:1 mapping with an index for the CCEs.

In a nineteenth example and in furtherance of any previous example, a non-transitory computer-readable storage medium, comprising a plurality of instructions, that when executed, enable processing circuitry of a base station to determine virtual CCEs corresponding to a PDCCH candidate $m_{n_{CI}}$ of the PDCCH candidates to assign in the non-highest aggregation level defined in a search space $S_k^{(L)}$, wherein $$S_k^{(L)} = L\left\{\left(Y_{p,k_p} + \left\lfloor \frac{m_{n_{CI}} \cdot \left(L_{max} \cdot M_{p,n_{CI}}^{(L_{max},pseudo)}\right)}{L \cdot M_{p,n_{CI}}^{(L)}} \right\rfloor + n_{CI}\right) \bmod \left\lfloor \frac{\left(L_{max} \cdot M_{p,n_{CI}}^{(L_{max},pseudo)}\right)}{L} \right\rfloor\right\} + i,$$

where for any common search space $Y_{p,k_p}=0$ and a UE-specific search space $Y_{p,k_p}=(A_p \cdot Y_{p,k_p-1}) \bmod D$, $Y_{p,-1}=n_{RNTI} \neq 0$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,n_{CI}}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

In a twentieth example and in furtherance of any previous example, a non-transitory computer-readable storage medium, comprising a plurality of instructions, that when executed, enable processing circuitry of user equipment (UE) to determine physical downlink control channel (PDCCH) candidates to monitor based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level, monitor the PDCCH candidates to receive downlink control information (DCI) from a base station, and receive, from the base station, the DCI via at least one of the PDCCH candidates.

In a twenty-first example and in furtherance of any previous example, a non-transitory computer-readable storage medium, comprising a plurality of instructions, that when executed, enable processing circuitry of user equipment (UE) to process each of the one or more aggregation levels includes a number of control channel elements (CCEs) and an aggregation level L of the one or more aggregation levels is $L \in \{1, 2, 4, 8, 16\}$ indicating the number of CCEs for the aggregation level L.

In a twenty-second example and in furtherance of any previous example, a non-transitory computer-readable storage medium, comprising a plurality of instructions, that when executed, enable processing circuitry of user equipment (UE) to process an aggregation level L of the one or more aggregation levels is $L \in \{1, 2, 4, 8, 16\}$, and the highest aggregation level includes 16 control channel elements (CCEs) and the one or more non-highest aggregation levels include less than 16 CCEs.

In a twenty-third example and in furtherance of any previous example, a non-transitory computer-readable storage medium, comprising a plurality of instructions, that when executed, enable processing circuitry of user equipment (UE) to determine control channel elements (CCEs) corresponding to a PDCCH candidate $m_{n_{CI}}$ of the PDCCH candidates to monitor in the highest aggregation level defined in a search space $S_k^{(L)}$, wherein $$S_k^{(L)} = L\left\{\left(Y_{p,k_p} + \left\lfloor \frac{m_{n_{CI}} \cdot N_{CCE,p}}{L \cdot M_{p,max}^{(L)}} \right\rfloor + n_{CI}\right) \bmod \lfloor N_{CCE,p}/L \rfloor\right\} + i,$$

where for any common search space $Y_{p,k_p}=0$ and a UE-specific search space $Y_{p,k_p}=(A_p \cdot Y_{p,k_p-1}) \bmod D$, $Y_{p,-1}=n_{RNTI} \neq 0$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,n_{CI}}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

In a twenty-fourth example and in furtherance of any previous example, a non-transitory computer-readable storage medium, comprising a plurality of instructions, that when executed, enable processing circuitry of user equipment (UE) to determine virtual CCEs corresponding to a PDCCH candidate $m_{n_{CI}}$ of the PDCCH candidates to monitor in the non-highest aggregation level defined in a search space $S_k^{(L)}$, wherein $$S_k^{(L)} = L \left\{ \left( Y_{p,k_p} + \left\lfloor \frac{m_{n_{CI}} \cdot \left( L_{max} \cdot M_{p,n_{CI}}^{(L_{max},pseudo)} \right)}{L \cdot M_{p,n_{CI}}^{(L)}} \right\rfloor + n_{CI} \right) \mod \left\lfloor \frac{\left( L_{max} \cdot M_{p,n_{CI}}^{(L_{max},pseudo)} \right)}{L} \right\rfloor \right\} + i,$$

where for any common search space $Y_{p,k_p}=0$ and a UE-specific search space $Y_{p,k_p}=(A_p \cdot Y_{p,k_p-1}) \mod D$, $Y_{p,-1}=n_{RNTI} \neq 0$, $A_0=39827$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,\cdot}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus of a base station, comprising:
baseband circuitry, including one or more processors, to:
determine physical downlink control channel (PDCCH) candidates to assign to a user equipment (UE) based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level;
select at least one of the PDCCH candidates to utilize to send downlink control information (DCI) to the UE; and
cause transmission of the DCI to the UE via the PDCCH candidates selected; and
a memory to store data including the one or more aggregation levels.

2. The apparatus of claim 1, wherein each of the one or more aggregation levels includes a number of control channel elements (CCEs) and an aggregation level L of the one or more aggregation levels is $L \in \{1, 2, 4, 8, 16\}$ indicating the number of CCEs for the aggregation level L.

3. The apparatus of claim 1, wherein an aggregation level L of the one or more aggregation levels is $L \in \{1, 2, 4, 8, 16\}$, and the highest aggregation level includes 16 control channel elements (CCEs), and the one or more non-highest aggregation levels include less than 16 CCEs.

4. The apparatus of claim 1, the one or more processors to further: determine control channel elements (CCEs) corresponding to a PDCCH candidate $m_{n_{CI}}$ of the PDCCH candidates to monitor in the highest aggregation level defined in a search space $S_k^{(L)}$, wherein $$S_k^{(L)} = L \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \mod \lfloor N_{CCE,p}/L \rfloor \right\} + i,$$

where for any common search space $Y_{p,k_p}=0$ and a UE-specific search space $Y_{p,k_p}=(A_p \cdot Y_{p,k_p-1}) \mod D$, $Y_{p,-1}=n_{RNTI} \neq 0$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,\cdot}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

5. The apparatus of claim 4, the one or more processors to further: generate a virtual index of the CCEs corresponding to the PDCCH candidate $m_{n_{CI}}$ of the PDCCH candidates assigned in the highest aggregation level to generate virtual CCEs, wherein the virtual index of the virtual CCEs to have a 1:1 mapping with an index for the CCEs.

6. The apparatus of claim 5, the one or more processors to further:
determine virtual CCEs corresponding to a PDCCH candidate $m_{n_{CI}}$ of the PDCCH candidates to assign in the non-highest aggregation level defined in a search space $S_k^{(L)}$, wherein $$S_k^{(L)} = L\left\{\left(Y_{P,k_p} + \left\lfloor\frac{m_{n_{CI}} \cdot \left(L_{max} \cdot M_{p,n_{CI}}^{(L_{max},pseudo)}\right)}{L \cdot M_{p,n_{CI}}^{(L)}}\right\rfloor + n_{CI}\right)\right.$$
$$\left.\mod\left\lfloor\frac{\left(L_{max} \cdot M_{p,n_{CI}}^{(L_{max},pseudo)}\right)}{L}\right\rfloor\right\} + i,$$

where for any common search space $Y_{p,k_p}=0$ and a UE-specific search space $Y_{p,k_p}=(A_p \cdot Y_{p,k_p-1}) \mod D$, $Y_{p,-1}=n_{RNTI}\neq 0$, $A_0=39827$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

7. The apparatus of claim 1, further comprising:
Radio Frequency (RF) circuitry of the base station, front-end module (FEM) circuitry of the base station, and one or more antennas of the base station, the RF circuitry, FEM circuitry, and the one or more antennas coupled with the memory and the one or more processors;
wherein the one or more processors are to further cause transmission of the DCI to the UE via the PDCCH candidates selected via the RF circuitry, FEM circuitry, and the one or more antennas.

8. An apparatus of a user equipment, comprising:
baseband circuitry, including one or more processors, to:
determine physical downlink control channel (PDCCH) candidates to monitor based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level;
monitor the PDCCH candidates to receive downlink control information (DCI) from a base station; and
receive, from the base station, the DCI via at least one of the PDCCH candidates; and
memory to store data including the one or more aggregation levels.

9. The apparatus of claim 8, wherein each of the one or more aggregation levels includes a number of control channel elements (CCEs) and an aggregation level L of the one or more aggregation levels is $L\in\{1, 2, 4, 8, 16\}$ indicating the number of CCEs for the aggregation level L.

10. The apparatus of claim 8, wherein an aggregation level L of the one or more aggregation levels is $L\in\{1, 2, 4, 8, 16\}$, and the highest aggregation level includes 16 control channel elements (CCEs) and the one or more non-highest aggregation levels include less than 16 CCEs.

11. The apparatus of claim 8, the one or more processors to further determine control channel elements (CCEs) corresponding to a PDCCH candidate $m_{n_{CI}}$ of the PDCCH candidates to monitor in the highest aggregation level defined in a search space $S_k^{(L)}$, wherein $$S_k^{(L)} = L\left\{\left(Y_{P,k_p} + \left\lfloor\frac{m_{n_{CI}} \cdot N_{CCE,p}}{L \cdot M_{p,max}^{(L)}}\right\rfloor + n_{CI}\right)\mod\lfloor N_{CCE,p}/L\rfloor\right\} + i,$$

where for any common search space $Y_{p,k_p}=0$ and a UE-specific search space $Y_{p,k_p}=(A_p \cdot Y_{p,k_p-1}) \mod D$, $Y_{p,-1}=n_{RNTI}\neq 0$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

12. The apparatus of claim 11, the one or more processors to further determine virtual CCEs corresponding to a PDCCH candidate $m_{n_{CI}}$ of the PDCCH candidates to monitor in the non-highest aggregation level defined in a search space $S_k^{(L)}$, wherein $$S_k^{(L)} = L\left\{\left(Y_{P,k_p} + \left\lfloor\frac{m_{n_{CI}} \cdot \left(L_{max} \cdot M_{p,n_{CI}}^{(L_{max},pseudo)}\right)}{L \cdot M_{p,n_{CI}}^{(L)}}\right\rfloor + n_{CI}\right)\right.$$
$$\left.\mod\left\lfloor\frac{\left(L_{max} \cdot M_{p,n_{CI}}^{(L_{max},pseudo)}\right)}{L}\right\rfloor\right\} + i,$$

where for any common search space $Y_{p,k_p}=0$ and a UE-specific search space $Y_{p,k_p}=(A_p \cdot Y_{p,k_p-1}) \mod D$, $Y_{p,-1}=n_{RNTI}\neq 0$, $A_0=39827$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

13. The apparatus claim 8, further comprising:
Radio Frequency (RF) circuitry of the UE, front-end module (FEM) circuitry of the UE, and one or more antennas of the UE, the RF circuitry, FEM circuitry, and the one or more antennas coupled with the memory and the one or more processors; and
wherein the one or more processors to further to receive the DCI from the base station via the RF circuitry, FEM circuitry, and the one or more antennas.

14. A non-transitory computer-readable storage medium, comprising a plurality of instructions, that when executed, enable processing circuitry of a base station to:
determine physical downlink control channel (PDCCH) candidates to assign to a user equipment (UE) based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level;
select at least one of the PDCCH candidates to utilize to send downlink control information (DCI) to the UE; and
cause transmission of the DCI to the UE via the PDCCH candidates selected.

15. The non-transitory computer-readable storage medium of claim 14, wherein each of the one or more aggregation levels includes a number of control channel elements (CCEs) and an aggregation level L of the one or more aggregation levels is $L \in \{1, 2, 4, 8, 16\}$ indicating the number of CCEs for the aggregation level L.

16. The non-transitory computer-readable storage medium of claim 14, wherein an aggregation level L of the one or more aggregation levels is $L \in \{1, 2, 4, 8, 16\}$, and the highest aggregation level includes 16 control channel elements (CCEs), and the one or more non-highest aggregation levels include less than 16 CCEs.

17. The non-transitory computer-readable storage medium of claim 14, comprising a plurality of instructions, that when executed, enable processing circuitry to determine control channel elements (CCEs) corresponding to a PDCCH candidate $m_{n_{CI}}$ of the PDCCH candidates to assign in the highest aggregation level defined in a search space $S_k^{(L)}$, wherein $$S_k^{(L)} = L \left\{ \left( Y_{p,k_p} + \left\lfloor \frac{m_{n_{CI}} \cdot N_{CCE,p}}{L \cdot M_{p,max}^{(L)}} \right\rfloor + n_{CI} \right) \bmod \lfloor N_{CCE,p}/L \rfloor \right\} + i,$$

where for any common search space $Y_{p,k_p}=0$ and a UE-specific search space $Y_{p,k_p}=(A_p \cdot Y_{p,k_p-1})$ mod D, $Y_{p,-1}=n_{RNTI} \neq 0$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

18. The non-transitory computer-readable storage medium of claim 17, comprising a plurality of instructions, that when executed, enable processing circuitry to generate a virtual index of the CCEs corresponding to the PDCCH candidate $m_{n_{CI}}$ of the PDCCH candidates assigned in the highest aggregation level to generate virtual CCEs, wherein the virtual index of the virtual CCEs to have a 1:1 mapping with an index for the CCEs.

19. The non-transitory computer-readable storage medium of claim 18, comprising a plurality of instructions, that when executed, enable processing circuitry to determine virtual CCEs corresponding to a PDCCH candidate $m_{n_{CI}}$ of the PDCCH candidates to assign in the non-highest aggregation level defined in a search space $S_k^{(L)}$, wherein $$S_k^{(L)} = L \left\{ \left( Y_{p,k_p} + \left\lfloor \frac{m_{n_{CI}} \cdot \left( L_{max} \cdot M_{p,n_{CI}}^{(L_{max},pseudo)} \right)}{L \cdot M_{p,n_{CI}}^{(L)}} \right\rfloor + n_{CI} \right) \bmod \left\lfloor \frac{\left( L_{max} \cdot M_{p,n_{CI}}^{(L_{max},pseudo)} \right)}{L} \right\rfloor \right\} + i,$$

where for any common search space $Y_{p,k_p}=0$ and a UE-specific search space $Y_{p,k_p}=(A_p \cdot Y_{p,k_p-1})$ mod D, $Y_{p,-1}=n_{RNTI} \neq 0$, $A_0=39827$, $A_1=39829$, and $D=65537$; $i=0, \ldots, L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0, \ldots, M_{p,n_{CI}}^{(L)}-1$, where $M_{p,}^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

20. A non-transitory computer-readable storage medium, comprising a plurality of instructions, that when executed, enable processing circuitry of user equipment (UE) to:
determine physical downlink control channel (PDCCH) candidates to monitor based on one or more aggregation levels, each PDCCH candidate in a highest aggregation level of the one or more aggregation levels assigned by a random distribution over a whole control channel element (CCE) domain, and each PDCCH candidate in one or more non-highest aggregation levels of the one or more aggregation levels assigned a random distribution over one or more CCEs utilized by PDCCH candidates of the highest aggregation level;
monitor the PDCCH candidates to receive downlink control information (DCI) from a base station; and
receive, from the base station, the DCI via at least one of the PDCCH candidates.

21. The non-transitory computer-readable storage medium of claim 20, wherein each of the one or more aggregation levels includes a number of control channel elements (CCEs) and an aggregation level L of the one or more aggregation levels is L∈{1, 2, 4, 8, 16} indicating the number of CCEs for the aggregation level L.

22. The non-transitory computer-readable storage medium of claim 20, wherein an aggregation level L of the one or more aggregation levels is L∈{1, 2, 4, 8, 16}, and the highest aggregation level includes 16 control channel elements (CCEs) and the one or more non-highest aggregation levels include less than 16 CCEs.

23. The non-transitory computer-readable storage medium of claim 20, comprising a plurality of instructions, that when executed, enable processing circuitry to determine control channel elements (CCEs) corresponding to a PDCCH candidate $m_{n_{CI}}$ of the PDCCH candidates to monitor in the highest aggregation level defined in a search space $S_k^{(L)}$, wherein $$S_k^{(L)} = L\left\{\left(Y_{p,k_p} + \left\lfloor \frac{m_{n_{CI}} \cdot N_{CCE,p}}{L \cdot M_{p,max}^{(L)}} \right\rfloor + n_{CI}\right) \bmod \lfloor N_{CCE,p}/L \rfloor\right\} + i,$$

where for any common search space $Y_{p,k_p}=0$ and a UE-specific search space $Y_{p,k_p}=(A_p \cdot Y_{p,k_p-1}) \bmod D$, $Y_{p,-1}=n_{RNTI}\neq 0$, $A_1=39829$, and $D=65537$; $i=0,\ldots,L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0,\ldots,M_{p,n_{CI}}^{(L)}-1$, where $M_p^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p.

24. The non-transitory computer-readable storage medium of claim 20, comprising a plurality of instructions, that when executed, enable processing circuitry to determine virtual CCEs corresponding to a PDCCH candidate $m_{n_{CI}}$ of the PDCCH candidates to monitor in the non-highest aggregation level defined in a search space $S_k^{(L)}$, wherein $$S_k^{(L)} = L\left\{\left(Y_{p,k_p} + \left\lfloor \frac{m_{n_{CI}} \cdot \left(L_{max} \cdot M_{p,n_{CI}}^{(L_{max},pseudo)}\right)}{L \cdot M_{p,n_{CI}}^{(L)}} \right\rfloor + n_{CI}\right) \bmod \left\lfloor \frac{\left(L_{max} \cdot M_{p,n_{CI}}^{(L_{max},pseudo)}\right)}{L} \right\rfloor\right\} + i,$$

where for any common search space $Y_{p,k_p}=0$ and a UE-specific search space $Y_{p,k_p}=(A_p \cdot Y_{p,k_p-1}) \bmod D$, $Y_{p,-1}=n_{RNTI}\neq 0$, $A_0=39827$, $A_1=39829$, and $D=65537$; $i=0,\ldots,L-1$; $n_{CI}$ is a carrier indicator field value for the UE when the UE is configured with a carrier indicator field for a serving cell, or for any common search space $n_{CI}=0$; $N_{CCE,p}$ is a number of CCEs, numbered from 0 to $N_{CCE,p}-1$, in the CCE domain $p$; $m_{n_{CI}}=0,\ldots,M_{p,n_{CI}}^{(L)}-1$, where $M_p^{(L)}$ is a number of NR PDCCH candidates the UE is configured to monitor for aggregation level L for the serving cell corresponding to $n_{CI}$; $M_{p,max}^{(L)}=M_{p,0}^{(L)}$ for any common search space; and $M_{p,max}^{(L)}$ is the maximum of $M_{p,n_{CI}}^{(L)}$ for all corresponding DCI formats overall configured $n_{CI}$ values for a CCE aggregation level L in CCE domain p; $M_{p,n_{CI}}^{(L_{max},pseudo)}$ is a sum of a number of the PDCCH candidates for the UE configured to monitor for aggregation level $L_{max}$ and a number of pseudo PDCCH candidates; and $L_{max}$ is the highest aggregation level.

* * * * *